United States Patent
Shintani

(10) Patent No.: US 7,561,184 B2
(45) Date of Patent: Jul. 14, 2009

(54) IMAGE SENSING/PLAYBACK APPARATUS, IMAGE DATA PROCESSING METHOD, AND DATA PROCESSING METHOD

(75) Inventor: Takuya Shintani, Kawasaki (JP)

(73) Assignee: Canon Kabushiki Kaisha

( * ) Notice: Subject to any disclaimer, the term of this patent is extended or adjusted under 35 U.S.C. 154(b) by 611 days.

(21) Appl. No.: 11/204,535

(22) Filed: Aug. 15, 2005

(65) Prior Publication Data

US 2006/0041886 A1 Feb. 23, 2006

(30) Foreign Application Priority Data

Aug. 18, 2004 (JP) .............................. 2004-238628
May 13, 2005 (JP) .............................. 2005-141831

(51) Int. Cl.
H04N 5/225 (2006.01)
G06F 13/00 (2006.01)
G06F 9/46 (2006.01)

(52) U.S. Cl. .................... 348/207.99; 711/151; 718/107

(58) Field of Classification Search ............ 348/231.99, 348/231.9, 231.1–231.2, 222.1, 207.99; 710/40, 710/20–22, 29, 33–36, 58–60, 240–244; 711/151; 718/100; 370/395.42

See application file for complete search history.

(56) References Cited

U.S. PATENT DOCUMENTS 5,528,513 A * 6/1996 Vaitzblit et al. ............. 718/103
6,963,374 B2 * 11/2005 Nakamura et al. ......... 348/333.11
2003/0161002 A1 * 8/2003 Nishiwaki et al. ........... 358/1.15
2006/0020703 A1 * 1/2006 England et al. ............. 709/226

FOREIGN PATENT DOCUMENTS

| JP | 1049388 | | 2/1998 |
| JP | 10049388 A | * | 2/1998 |
| JP | 10283204 | | 10/1998 |

* cited by examiner

*Primary Examiner*—Tuan V Ho
*Assistant Examiner*—Euel K Cowan
(74) *Attorney, Agent, or Firm*—Cowan, Liebowitz & Latman, P.C.

(57) ABSTRACT

The image sensing/playback apparatus has an image sensing device that senses an image of an object and obtains electrical image data, an input/output I/F that inputs/outputs image data from/to an external storage medium, and a system controller that sequentially performs a plurality of tasks, exclusively controlling the input/output I/F and having respective priorities decided in advance, while giving an opportunity to switch between the plurality of tasks after processing of one unit data amount of data. The one unit data amount is one of the first unit data amount that is large and the second unit data amount that is smaller than the first unit data amount. If an instruction is given to perform the second task of the plurality of tasks while the first task, different from the second task, is performed to process the first unit data amount at a time, the system controller sets the unit data amount of one with a higher priority of the first and second tasks to the first unit data amount and the unit data amount of the other task with a lower priority to the second unit data amount to perform the tasks.

21 Claims, 22 Drawing Sheets

F I G. 19
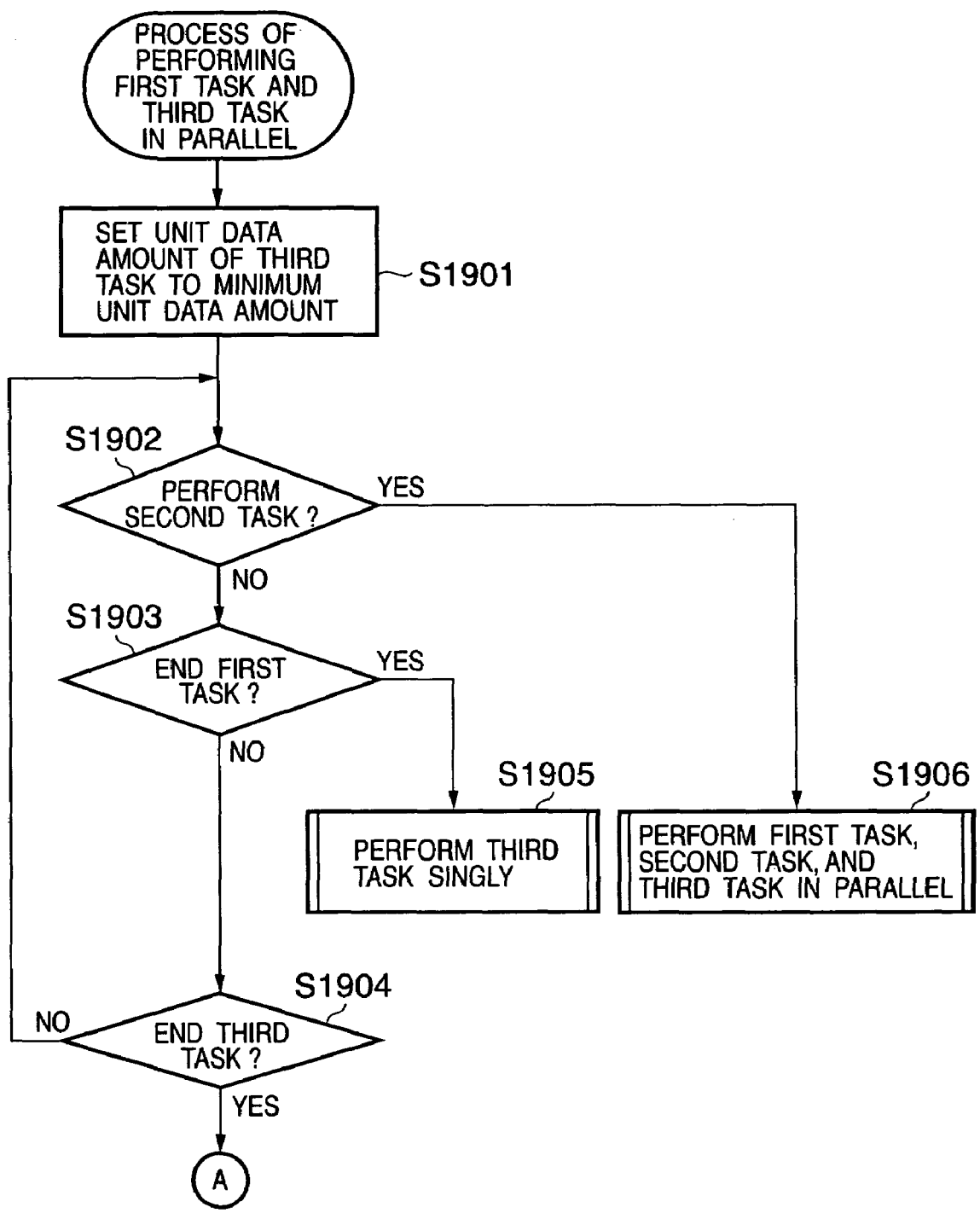

IMAGE SENSING/PLAYBACK APPARATUS, IMAGE DATA PROCESSING METHOD, AND DATA PROCESSING METHOD

FIELD OF THE INVENTION

The present invention relates to an image sensing/playback apparatus and an image data and non-image data processing method in the image sensing/playback apparatus and, more particularly, to an image sensing/playback apparatus which inputs/outputs image data from/to a recording medium through a common input/output interface and can perform multi-task operations and an image data and non-image data processing method in the image sensing/playback apparatus.

BACKGROUND OF THE INVENTION

A conventional general image sensing/playback apparatus comprises a so-called input/output device which performs writing of data on a recording medium and reading of data from the recording medium to record a sensed image or play back a recorded image. The CPU of the apparatus performs control in a so-called multi-task fashion in which a plurality of processes are apparently simultaneously performed. If different tasks try to access the common input/output device during control in such a multi-task manner, one of the tasks which tries to gain access first exclusively uses the input/output device until the task ends its processing. Another task which tries to access the input/output device later performs input/output processing after the input/output device enters an idle state when the task having tried to gain access earlier ends input/output processing.

In a method of accessing an input/output device as described above, even if a task with high urgency demands access to an input/output device, the task needs to wait until another task already accessing the input/output device, if any, ends access to the input/output device. Accordingly, a process which the user wants to perform with priority may be forced to wait. To cope with this problem, there are proposed processing methods which allow a task with high urgency to perform processing for a common device with priority by, e.g., inserting a sleep into a task with a low priority level and skipping, without any processing, a task which is sleeping when its turn for processing comes, shortening one period for access to a common device, or the like (see, e.g., Japanese Patent Laid-Open No. 10-283204).

Japanese Patent Laid-Open No. 10-283204 describes that one access period and sleep period for each task are decided on the basis of its priority level. However, under such control, if no task with a high priority level demands access to a common device, and only tasks with a low priority level demand access to the common device, there may occur a period when all tasks are sleeping. In this case, since no task accesses the common device, the processing efficiency decreases.

Also, even when the access periods and sleep periods of a plurality of tasks at a certain point in time achieve high processing efficiency, the same access periods and sleep periods continue to be used even after any one of the plurality of tasks ends, for example. For this reason, if a task with a high priority level ends, there may occur a period when all of continuing tasks with a low priority level are sleeping, and the processing efficiency may decrease.

Moreover, if a task with a low priority level is added when a plurality of tasks are accessing a common device, there may be a case in which a period when all of tasks with a low priority level are sleeping does not occur, and the plurality of tasks may be performed simply in order for a set access period at a time, and the processing of a task with a high priority level may take a long time.

SUMMARY OF THE INVENTION

The present invention has been made in consideration of the above situation, and has as its object to, in an image sensing/playback apparatus under multi-task control, perform, with priority, a task with a higher priority when accessing a common input/output device and increase the overall efficiency in processing which involves access to the input/output device.

According to the present invention, the foregoing object is attained by providing an image sensing/playback apparatus comprising: an image sensing device that senses an image of an object and obtains electrical image data; an input/output unit that inputs/outputs data including image data from/to an external storage medium; a controller that sequentially performs a plurality of tasks while giving an opportunity to switch between the plurality of tasks after processing of one unit data amount of data, the plurality of tasks exclusively controlling the input/output unit and having respective priorities decided in advance, wherein the one unit data amount is one of a plurality of different data amounts to be processed in one operation, and if an instruction is given to perform one of the plurality of tasks while at least another task is performed, the controller sets one unit data amount of a task with the highest priority of the tasks to be performed to the largest data amount and one unit data amount of a task with a lower priority to a data amount smaller than the data amount of the task with the highest priority to perform the tasks.

According to the present invention, the foregoing object is also attained by providing a data processing method in an image sensing/playback apparatus having an image sensing device that senses an image of an object and obtains electrical image data, an input/output unit that inputs/outputs data including image data from/to an external storage medium, and a controller that sequentially performs a plurality of tasks while giving an opportunity to switch between the plurality of tasks after processing of one unit data amount of data, the plurality of tasks exclusively controlling the input/output unit and having respective priorities decided in advance, the method comprising if an instruction is given to perform one of the plurality of tasks while at least another task is performed, setting by the controller one unit data amount of a task with the highest priority of the tasks to be performed to the largest data amount and one unit data amount of a task with a lower priority to a data amount smaller than the data amount of the task with the highest priority.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 19 is a flowchart for explaining the process of performing the first task and third task in parallel according to the second embodiment of the present invention;

DETAILED DESCRIPTION OF THE PREFERRED EMBODIMENTS

Preferred embodiments of the present invention will be described in detail in accordance with the accompanying drawings.

First Embodiment

First, a configuration of an image processing apparatus according to the first embodiment is explained with reference to FIG. 1.

Figure 1:
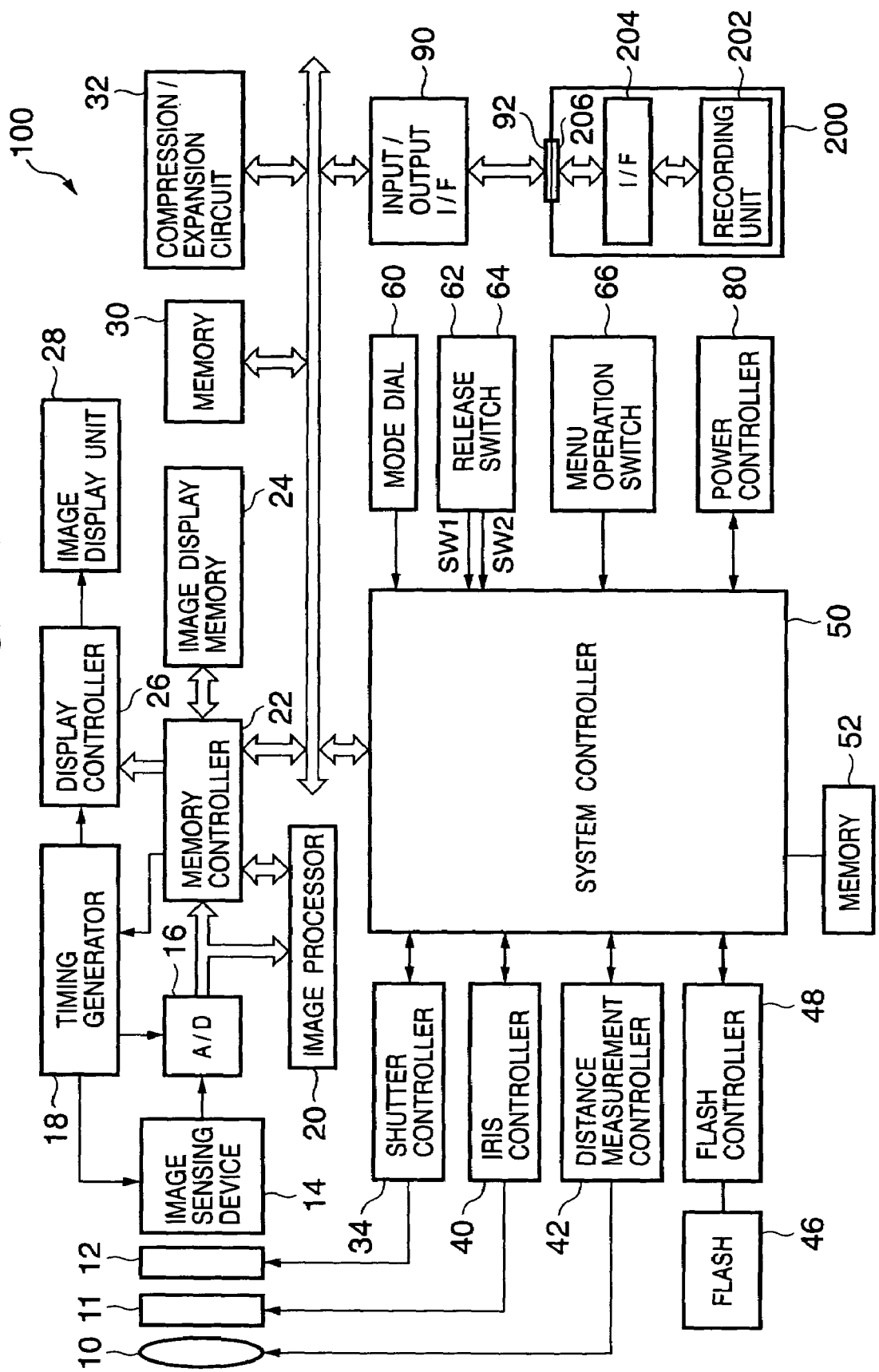
FIG. 1 is a block diagram showing an arrangement of an image processing apparatus according to a first embodiment of the present invention.

In FIG. 1, reference numeral 100 denotes an image processing apparatus. The image processing apparatus may be any of a digital camera, a digital video camera, and a mobile terminal equipped with a camera (including a mobile phone with a camera). The first embodiment is described assuming that the image processing apparatus 100 is a digital camera.

In the image processing apparatus 100, 10 denotes an image sensing lens; 11, a diaphragm, 12, a shutter; 14, an image sensing device which converts an optical image into an electric signal; and 16, an A/D converter which converts an analog signal output from the image sensing device 14 into a digital signal.

Numeral 18 denotes a timing generator which supplies a clock signal and a control signal respectively to the image sensing device 14, the A/D converter 16 and a display controller 26, under the control of a memory controller 22 and a system controller 50.

Numeral 20 denotes an image processor which performs predetermined pixel interpolation processing, color conversion processing and the like on image data from the A/D converter 16 or image data from the memory controller 22. The image processor 20 also performs predetermined calculation processing using the image data outputted from the A/D converter 16, and the system controller 50 performs through-the-lens (TTL) auto focus (AF) processing, auto exposure (AE) processing, pre-flash (EF) processing with respect to an iris controller 40 and a distance measurement controller 42, based on the result of calculations. Further, the image processor 20 performs predetermined calculation using the image data outputted from the A/D converter 16, and performs TTL auto white balance (AWB) processing, based on the result of calculations.

The memory controller 22 controls the A/D converter 16, the timing generator 18, the image processor 20, an image display memory 24, the display controller 26, a memory 30 and a compression/expansion circuit 32. The image data outputted from the A/D converter 16 is written into the image display memory 24 or the memory 30 via the image processor 20 and the memory controller 22, or only via the memory controller 22.

Numeral 24 denotes an image display memory; 26, the display controller; and 28, an image display unit comprising an LCD (Liquid Crystal Display) or the like. Image data written into the image display memory 24 is displayed on the image display unit 28 via the display controller 26.

An electronic finder function is realized by sequentially displaying obtained images on the image display unit 28. Further, the image display unit 28 arbitrarily turns ON/OFF its display, in accordance with an instruction from the system controller 50. If the display is turned OFF, the electric consumption of the image processing apparatus 100 can be greatly reduced. Further, the image display unit 28 displays information on, inter alia, focusing state, camera shaking state, shutter speed, f-value, and exposure control in accordance with an instruction from the system controller 50.

The memory 30, used for storing obtained still images and moving images, has a sufficient storage capacity for storing a predetermined number of still images and a moving image for a predetermined period. In sequential image sensing to sequentially obtain a plural number of still images or panoramic images sensing, a large amount of image data can be written into the memory 30 at a high speed. Further, the memory 30 may be used as a work area for the system controller 50. Moreover, the memory 30 may be used in a process of loading image data from a recording medium which will be described later to the memory 30, writing the image data to the image display memory 24 via the image processor 20 and memory controller 22, then displaying the image data to the image display unit 28 by the display controller 26.

The compression/expansion circuit 32 has following functions. The compression/expansion circuit 32 reads image data from the memory 30, performs compression on the image data by a predetermined image compression method (inter alia, adaptive discrete cosine transformation (ADCT) or the like), and writes the compressed image data in the memory 30. Further, compression/expansion circuit 32 expands image data read from the memory 30 and writes the expanded data to the memory 30.

The shutter controller 34 controls the shutter 12, and the iris controller 40 controls the diaphragm 11. The distance measurement controller 42 controls focusing of the image sensing lens 10. Numeral 46 denotes a strobe light, and numeral 48 denotes a strobe light controller.

The system controller 50 controls the overall image processing apparatus 100. Memory 52, such as a ROM, stores the constants, variables, and programs for operation of the system controller 50. The memory 52 stores various programs, such as a program for image sensing operation, a program for image processing, a program for recording generated image file data to a recording medium, a program for reading image file data from a recording medium. The memory 52 further stores various programs such as an operating system (OS) which realizes and executes multi-task operations of the foregoing programs. A message queue is generated for each program, and messages are accumulated in the message queue in a FIFO (First In First Out) fashion. The respective programs are controlled in relation to each other by exchanging the messages among the programs, which realizes the control of the above-described functions.

Numerals 60, 62, 64 and 66 denote operation means for inputting various operation instructions to the system controller 50, comprising a single or plurality of combinations of switches, dials, touch panels, a device for pointing by line-of-sight detection, a voice recognition device, and the like.

Next, the operation means will be described in more detail.

Numeral 60 denotes a mode dial switch for selecting various function modes such as power ON/OFF, a playback mode, an automatic image sensing mode, a programmed image sensing mode, a shutter-speed-priority image sensing mode, an aperture-priority image sensing mode, a manual image sensing mode, a portrait image sensing mode, a landscape image sensing mode, a close-up image sensing mode, a sports image sensing mode, a night-view image sensing mode, a multi-image playback/deletion mode, and a PC connection mode.

Numeral 62 denotes a release switch SW1 turned ON by half stroke of a shutter button (not shown), to instruct start of the operations of the AF processing, the AE processing, the AWB processing, the EF processing and the like.

Numeral 64 denotes a release switch SW2 turned ON by full stroke of the shutter button (not shown), to instruct start of a series of operations of exposure processing to write a signal read from the image sensing device 14 into the memory 30, via the A/D converter 16 and the memory controller 22, development processing by using calculations by the image processor 20 and the memory controller 22, and recording processing to read the image data from the memory 30, compress the image data by the compression/expansion circuit 32, and write the compressed image data into the recording medium 200.

Numeral 66 denotes a menu operation switch configured with a combination of a menu key, a set key, a cross key (these keys are not shown), or the like. With the menu operation switch 66, a user can change image sensing conditions and developing conditions of camera while checking the change on the image display unit 28.

Numeral 80 denotes a power controller comprising a battery detection circuit, a DC-DC converter, a switch circuit to select the block to be energized and the like. The power controller 80 detects the attached/detached state of the battery, the battery type and the remaining battery power level, controls the DC-DC converter based on the results of detection and an instruction from the system controller 50, and supplies a necessary voltage to the respective parts including the recording medium for the necessary period.

Numeral 90 denotes an interface to a recording medium such as a memory card and a hard disk; and 92, a connector for connection with the recording medium such as a memory card or a hard disk.

In the present embodiment, one system of interface and connector for connection with the recording medium is employed. However, the number of systems is not limited, and a single or plurality of systems of interfaces and connectors may be provided. Further, interfaces and connectors pursuant to different standards may be combined.

As the interfaces and connectors, those in conformity with Personal Computer Memory Card International Association standards (PCMCIA cards) and those in conformity with compact flash (CF) (registered trademark) card standards may be used. In a case where an interface and a connector in conformity with the PCMCIA standards, CF card standards and the like are used as the interface 90 and the connector 92, image data and management information attached to the image data are transmitted/received with respect to other peripheral devices such as a computer and a printer by connection with various communication cards such as a LAN card, a modem card, a USB card, an IEEE 1394 card, a P1284 card, an SCSI card and a PHS card.

The recording medium 200 comprises a memory card, a hard disk or the like. The recording medium 200 has a recording unit 202 of a semiconductor memory, a magnetic disk or the like, the interface 204 for communication with the image processing apparatus 100, and the connector 206 for connection with the image processing apparatus 100.

Figure 2:
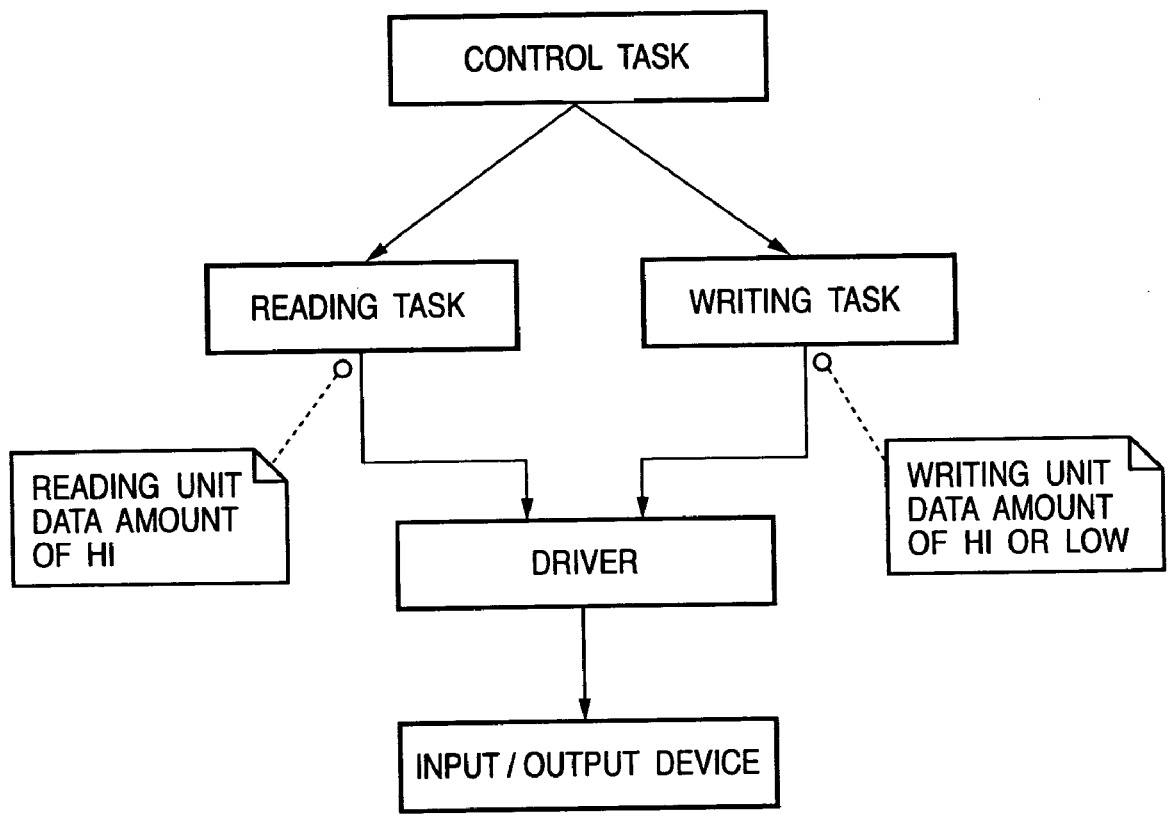
FIG. 2 is a diagram for explaining the relationship among tasks according to the first embodiment of the present invention.

Next, various tasks will be explained. The first embodiment will focus attention on the relationship among three tasks of a writing task for recording, on the recording medium 200, image data in the memory 30 created by image sensing processing, a reading task for reading out, into the memory 30, image data recorded on the recording medium 200, and a control task for controlling these two tasks. FIG. 2 shows the relationship among the three tasks. In this embodiment, sensed image data is temporarily stored in the memory 30 and then is written on the recording medium 200. Accordingly, the reading task is assigned a higher priority than the writing task in consideration of the usability for the user.

The control task is a task which controls the writing task and reading task and switches the setting of a writing unit data amount (to be described later) between HI and LOW for the writing task and reading task. In the first embodiment, the reading task has a higher priority than the writing task. For this reason, the control task switches the unit data amount of the writing task, thereby performing control such that the reading task can exclusively use the recording medium with priority.

Figure 3:
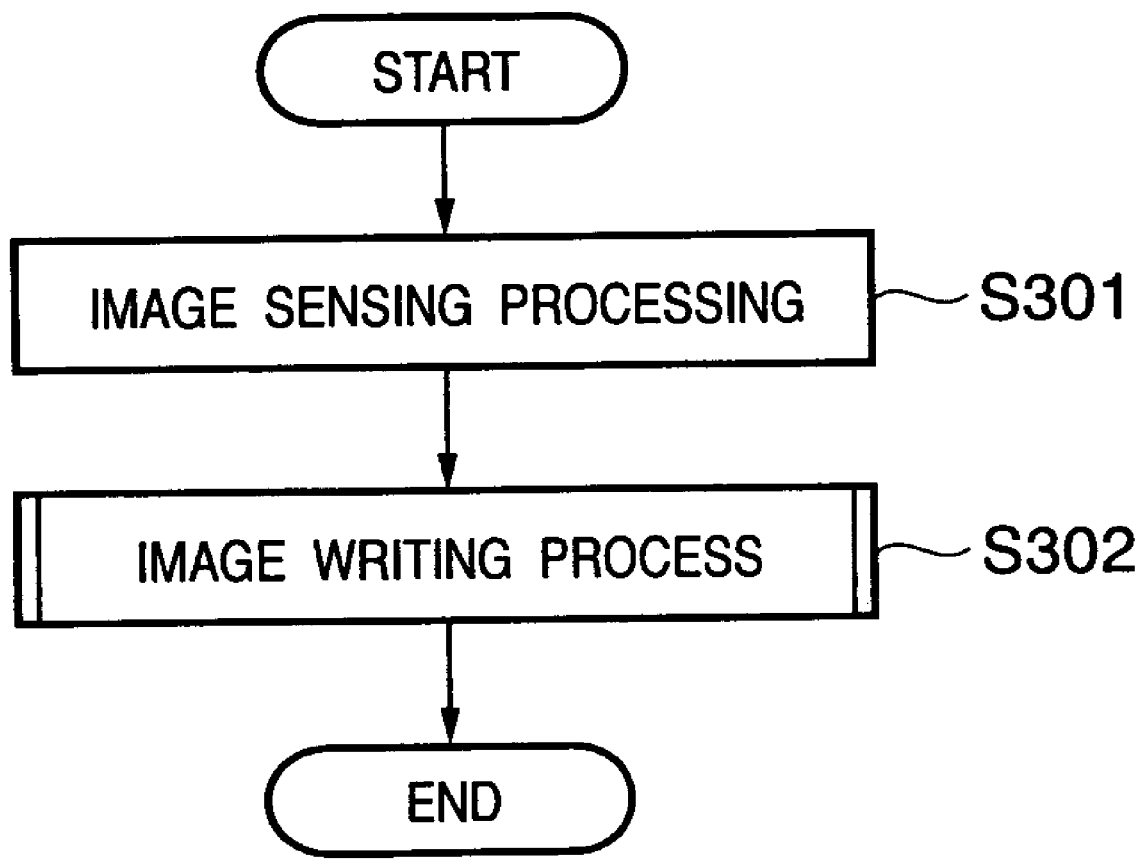
FIG. 3 is a flowchart for explaining an image sensing sequence according to the first embodiment of the present invention.

FIG. 3 is a flowchart for explaining a sequence from image sensing to recording of image data on the recording medium 200. In step S301, as described in the explanation of FIG. 1, a series of image sensing processes including AF processing, AE processing, and exposure processing are performed in response to an operation of the release switches SW1 (62) and SW2 (64), and image data obtained by the image sensing is temporarily stored in the memory 30. The flow shifts to an image writing process (step S302). In the image writing process, image data is written on the recording medium 200. The details of the image writing process will be described later with reference to FIG. 5. The series of image sensing operations are performed in this manner.

Figure 4:
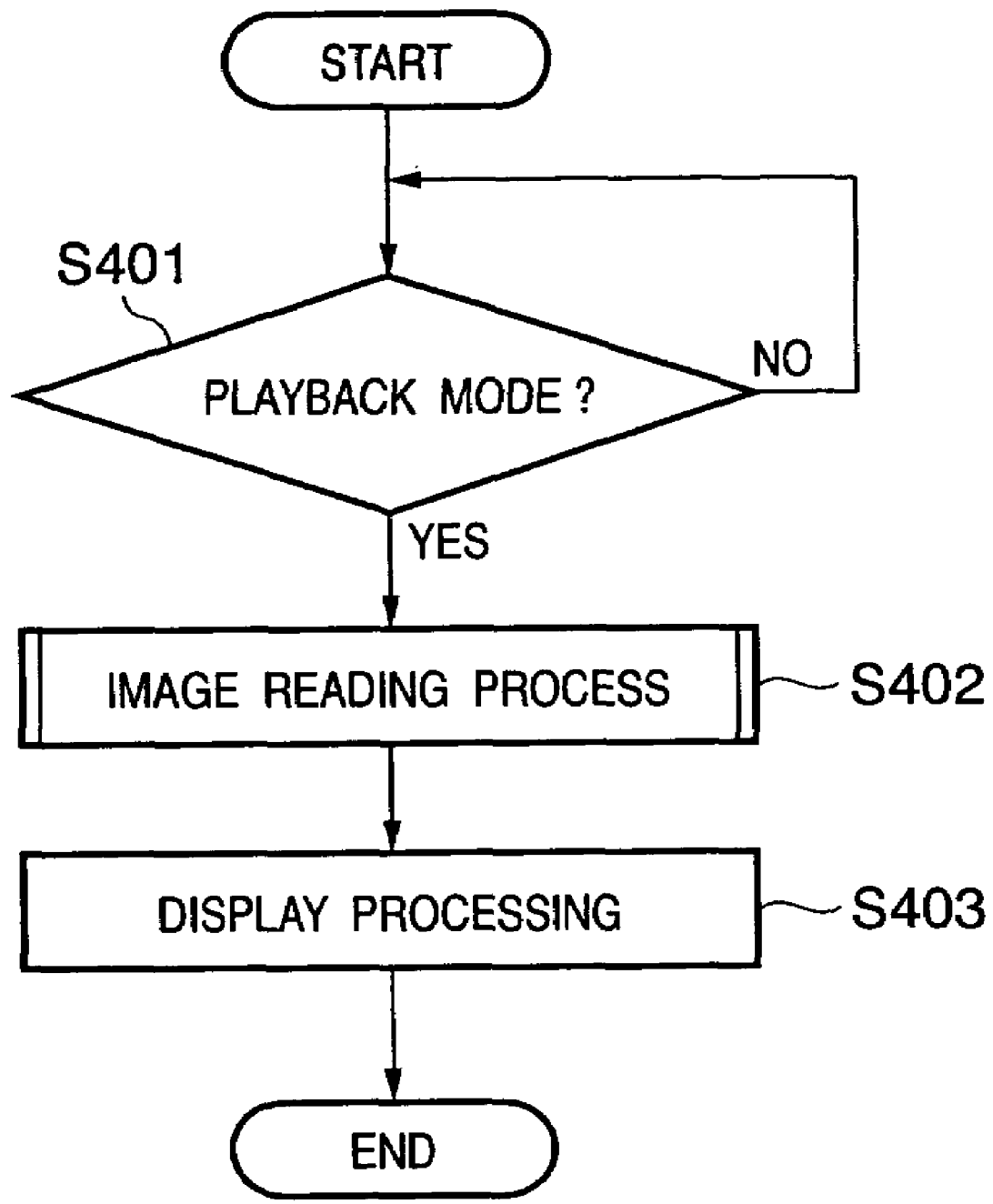
FIG. 4 is a flowchart for explaining a playback sequence according to the first embodiment of the present invention.

FIG. 4 is a flowchart for explaining a sequence from reading image data from the recording medium 200 to displaying it on the image display unit 28. In step S401, it is determined whether the mode dial 60 is set to a playback mode. If the mode dial 60 is set to the playback mode, the flow shifts to an image reading process in step S402. In the image reading process, the process of reading out image data from the recording medium 200 into the memory 30 is performed. The details of the image reading process will be described later with reference to FIG. 6. The flow shifts to display processing (step S403). In step S403, the process of displaying, by the display controller 26, image data having been read out into the memory 30 on the image display unit 28 is performed. Since the display processing is well known, no further detailed explanation will be given. The series of playback/display operations are performed in this manner.

Figure 5:
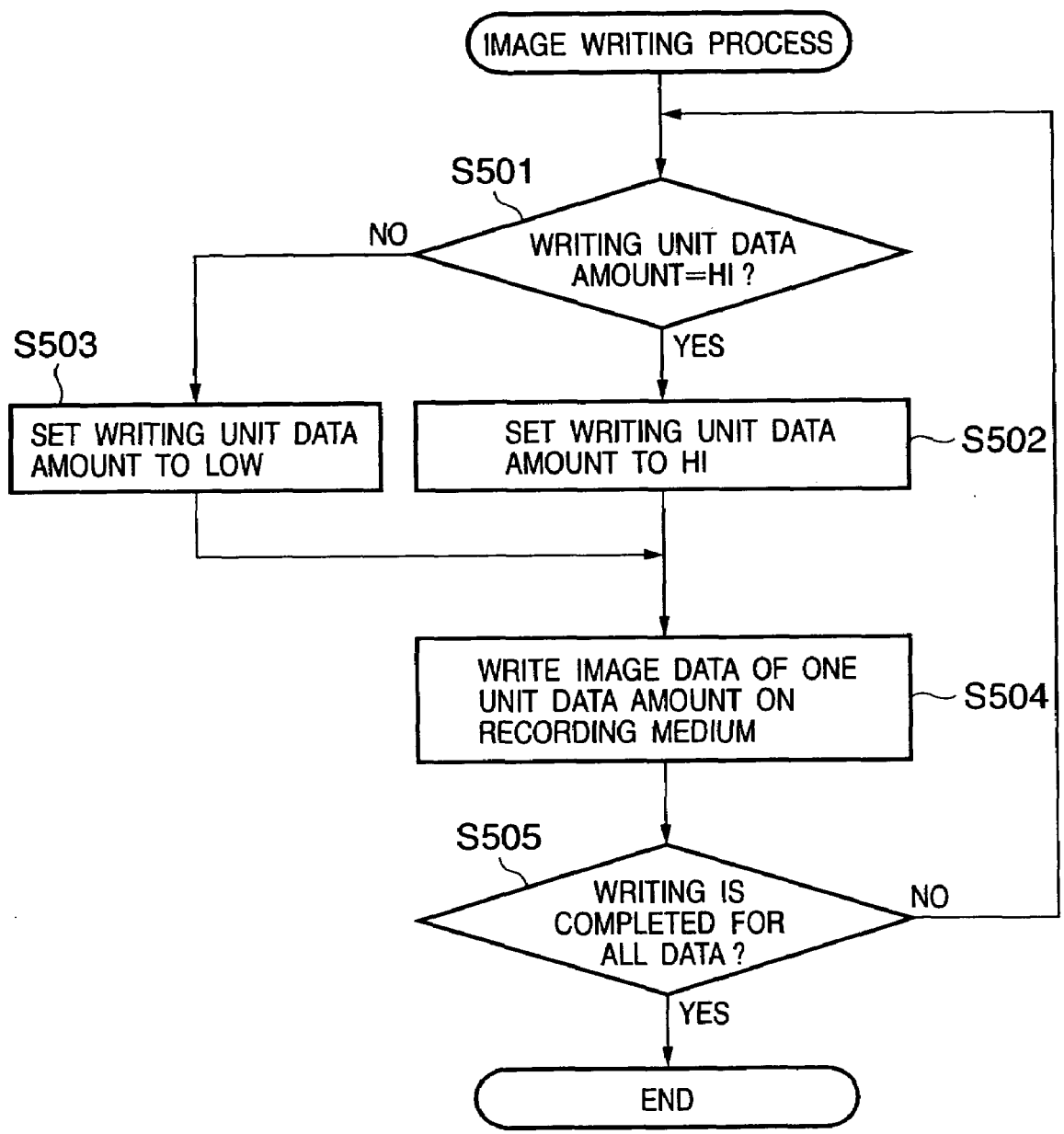
FIG. 5 is a flowchart for explaining a writing sequence in the image sensing sequence according to the first embodiment of the present invention.

The writing process (task) for recording image data on the recording medium 200 to be performed in step S302 of FIG. 3 will be explained with reference to the flowchart of FIG. 5.

First, in step S501, it is determined whether a writing unit data amount is to be set to HI. A writing unit data amount is the maximum amount of data which can be written on the recording medium 200 at a time while exclusively using the recording medium 200 and is set by the control task. Assume that in the first embodiment, image data created by image sensing processing is several tens of MB (megabyte) in size. In this case, the image data of several tens of MB is not written at a time but is written in data blocks (unit data amount) of several KB to several MB at a time. The writing of one block is repeated a plurality of times to write image data of one image.

If the writing unit data amount is to be set to HI (YES in step S501), the flow shifts to step S502 to set a writing unit data amount to HI. In the first embodiment, the unit data amount denoted by HI is 2 MB. If the writing unit data amount is not to be set to HI (NO in step S501), the flow shifts to step S503 to set the writing unit data amount to LOW. In the first embodiment, the unit data amount denoted by LOW is 1 KB. The flow shifts to step S504 to perform writing on the recording medium 200 by the set unit data amount at a time. When writing of one unit data amount is completed, it is determined whether writing is completed for all data. If writing is completed for all data, the process ends; otherwise, the flow returns to step S501 to repeat the same processing. This prevents the writing task from exclusively using the recording medium all the while the writing task writes data on the recording medium in the writing processing.

Figure 6:
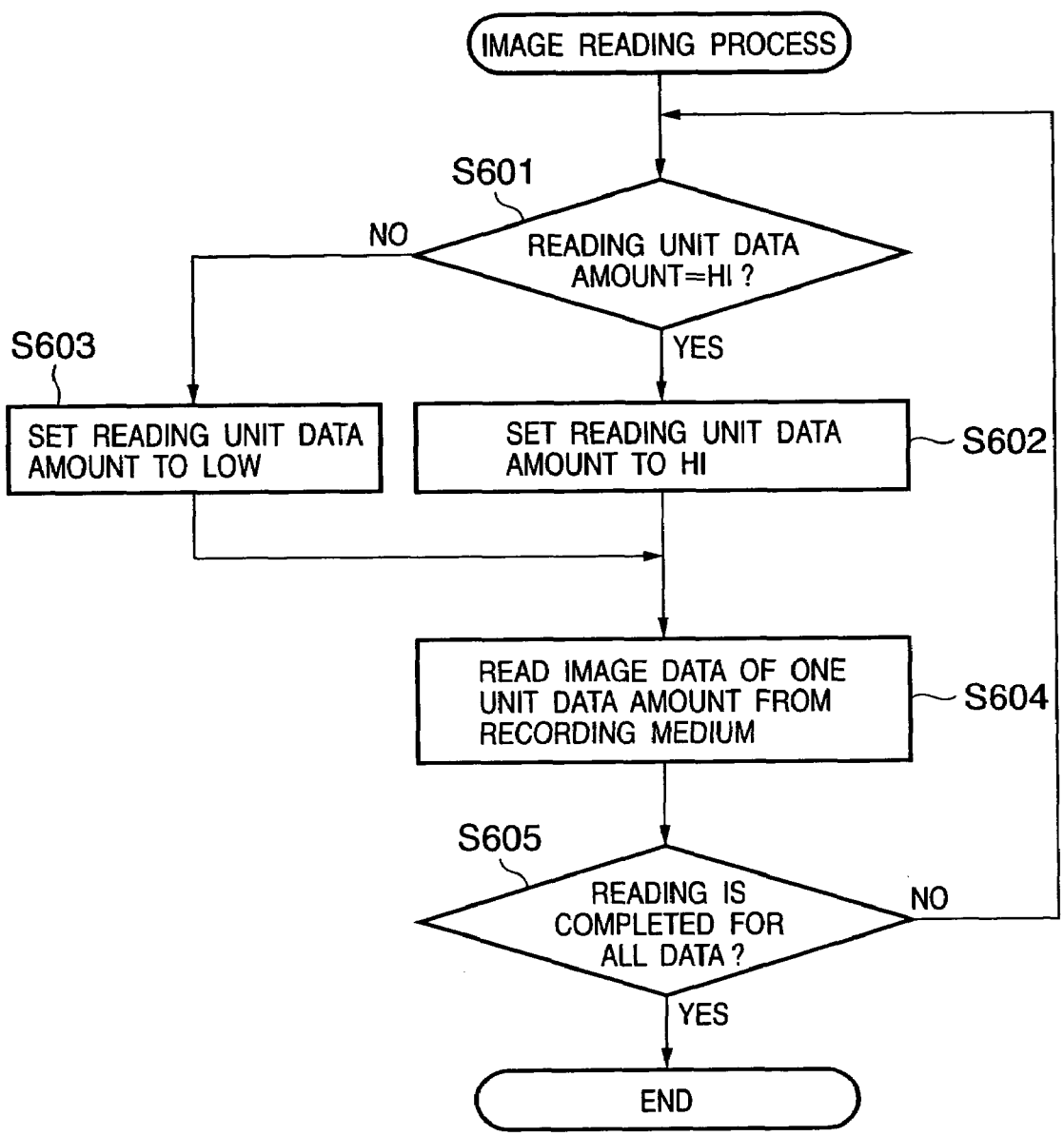
FIG. 6 is a flowchart for explaining a reading sequence in the playback sequence according to the first embodiment of the present invention.

The reading process (task) of reading image data from the recording medium 200 to be performed in step S402 of FIG. 4 will be explained with reference to the flowchart of FIG. 6.

First, in step S601, it is determined whether a reading unit data amount is to be set to HI. A reading unit data amount is the maximum amount of data which can be read from the recording medium 200 at a time while exclusively using the recording medium 200 and is set by the control task. Assume that in the first embodiment, image data to be read from the recording medium 200 is several tens of MB (megabyte) in size. In this case, the image data of several tens of MB is not read at a time but is read in data blocks (unit data amount) of several KB to several MB at a time. The reading of one block is repeated a plurality of times to read one image data into the memory 30.

If the reading unit data amount is to be set to HI (YES in step S601), the flow shifts to step S602 to set the reading unit data amount to HI. In the first embodiment, a unit data amount denoted by HI is 2 MB. If the reading unit data amount for reference is not to be set to HI (NO in step S601), the flow shifts to step S603 to set the reading unit data amount to LOW. In the first embodiment, a unit data amount denoted by LOW is 1 KB. The flow shifts to step S604 to perform reading from the recording medium 200 by the set unit data amount at a time. When reading of one unit data amount is completed, it is determined whether reading is completed for all data. If reading is completed for all data, the process ends; otherwise, the flow returns to step S601 to repeat the same processing. This prevents the reading task from exclusively using the recording medium all the while the reading task reads data from the recording medium in the reading processing.

Figure 7:
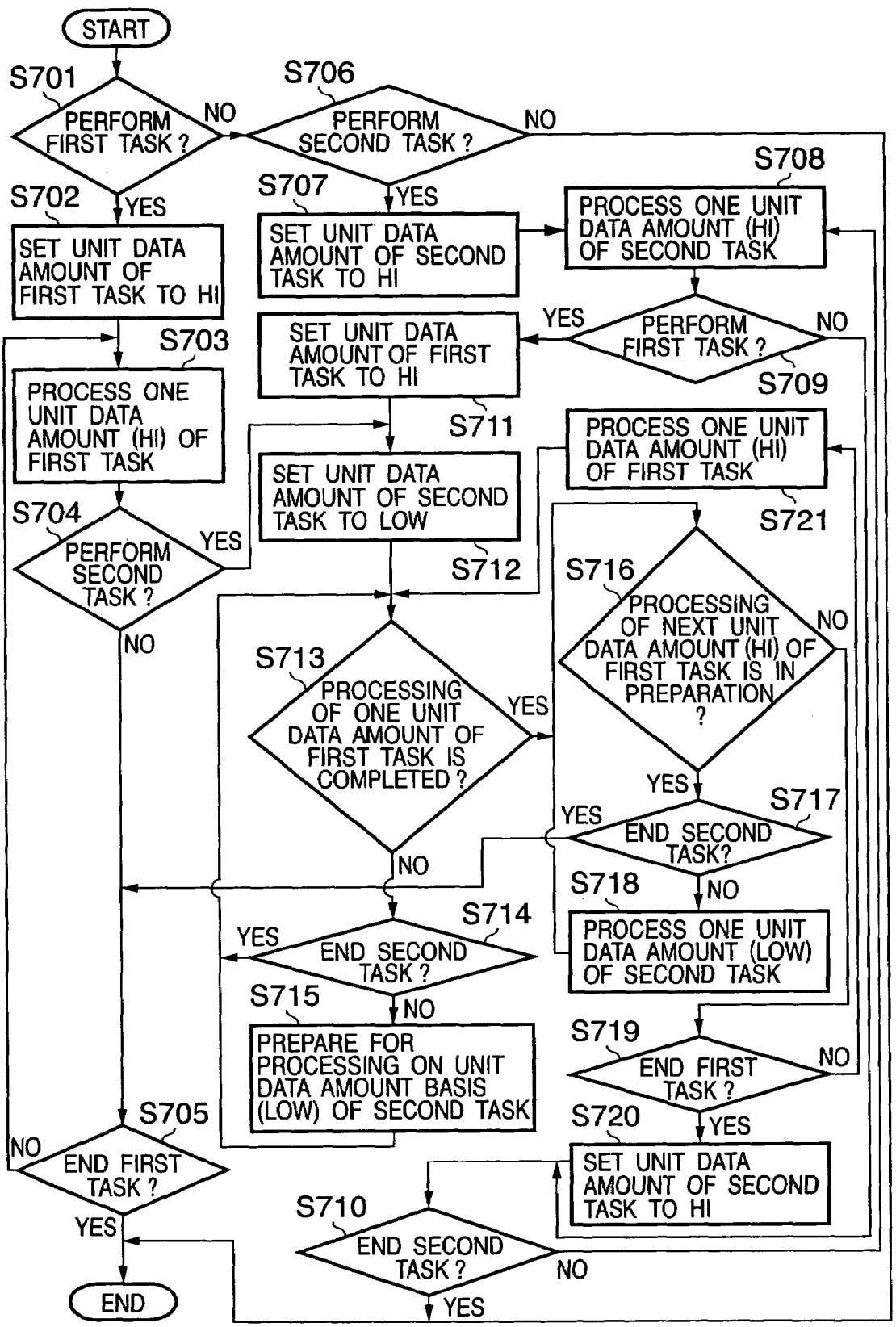
FIG. 7 is a flowchart for explaining a unit data amount setting sequence of a control task according to the first embodiment of the present invention.

Control of the unit data amounts of a plurality of tasks by the control task will be explained with reference to the flowchart of FIG. 7. In FIG. 7, a first task has a higher priority than a second task. Of the writing task and reading task, the reading task has a higher priority than the writing task. Accordingly, the reading task corresponds to the first task while the writing task corresponding to the second task.

First, in step S701, it is determined whether to perform the first task. If the first task is to be performed, the unit data amount of the first task is set to HI in step S702. The first task performs repetitive processing using the set unit data amount of HI as a unit. After the first task processes one unit data amount in step S703, it is determined in step S704 whether an instruction is given to perform the second task while the one unit data amount is being processed. If it is determined that an instruction to that effect is given, the flow advances to step S712. If it is determined that no instruction is given, it is determined in step S705 whether the first task is completed. If the first task is not completed, the flow returns to step S703; otherwise, the control process ends.

On the other hand, if it is determined in step S701 that the first task is not to be performed, the flow advances to step S706 to determine whether to perform the second task. If the second task is not to be performed, the control process ends without any processing; otherwise, the unit data amount of the second task is set to HI in step S707. The second task performs repetitive processing using the set unit data amount of HI as a unit. After the second task processes one unit data amount in step S708, it is determined in step S709 whether an instruction is given to perform the first task while the one unit data amount is being processed. If it is determined that an instruction to that effect is given, the unit data amount of the first task is set to HI in step S711, and the flow advances to step S712. If it is determined that no instruction is given, it is determined in step S710 whether the second task is completed. If the second task is not completed, the flow returns to step S708; otherwise, the control process ends.

Since in step S712, the first task and second task are simultaneously instructed to perform their processing, the unit data amount of the second task is set to LOW.

In step S713, it is determined whether processing of one unit data amount of the first task is completed on the device side (corresponding to the recording medium side in the processing of the image data writing task and image data reading task). More specifically, the processing of each task is composed of processing to be performed on the system controller side and that to be performed on the device side. While processing is performed on the device side, the system controller side has leeway. For this reason, it is determined whether processing is waited for to be completed on the device side, in order to prepare for the processing on a unit data amount basis of the second task.

If it is determined in step S713 that the processing of one unit data amount of the first task is waited for to be completed on the device side, it is determined in step S714 whether the second task is already completed. If the second task is completed, the flow returns to step S713.

If the second task is not completed, the processing of the second task to be performed by the system controller is performed in step S715, and preparations are made for the processing on a unit data amount basis of the second task. After that, the flow returns to step S713 to determine whether the processing of the first task is waited for again to be completed on the device side.

If the processing on the device side is completed in step S713, the flow advances to step S716 to determine whether processing of the next unit data amount of the first task is in preparation. More specifically, the processing of the first task is completed by repeatedly processing one unit data amount, and a predetermined preparation operation may be needed between processing of a unit data amount and that of the next unit data amount. Whether the processing of the first task is in preparation is determined because the device is not used during such a preparation operation. If it is determined in step S716 that the processing of the first task is in preparation, it is determined in step S717 whether the second task is already completed. If the second task is completed, the flow shifts to step S705.

If the second task is not completed, the flow advances to step S718 to control the second task so as to process one unit data amount. Note that one unit data amount of the second task has been set to LOW in step S712. More specifically, the device having been used by the first task comes to be used by the second task along with the operation of preparing for the first task. The second task is performed.

When processing is completed for one unit data amount of the second task, the flow returns to step S716 to determine again whether the processing of the first task is in preparation. Accordingly, in some cases, the second task may be performed repeatedly to process a unit data amount of LOW at a time.

If it is determined in step S716 that the processing of the first task is not in preparation, it is determined in step S719 whether the first task is completed. If the first task is not completed yet, the first task is controlled so as to process one unit data amount in step S721. Note that the unit data amount of the first task is set to HI. If one unit data amount of the first task is processed in step S721, the flow returns to step S713.

If it is determined in step S719 that the first task is completed, only the second task is being performed at this time. In step S720, the unit data amount of the second task is set to HI, and the flow advances to step S710.

Such a change in unit data amount makes it possible to reduce the unit data amount of a task with a low priority and process a task with a high priority at higher speed when two tasks are performed. Also, when only one task is performed, the task being performed can be processed at high speed by increasing the unit data amount regardless of the priority of the task.

Figure 8:
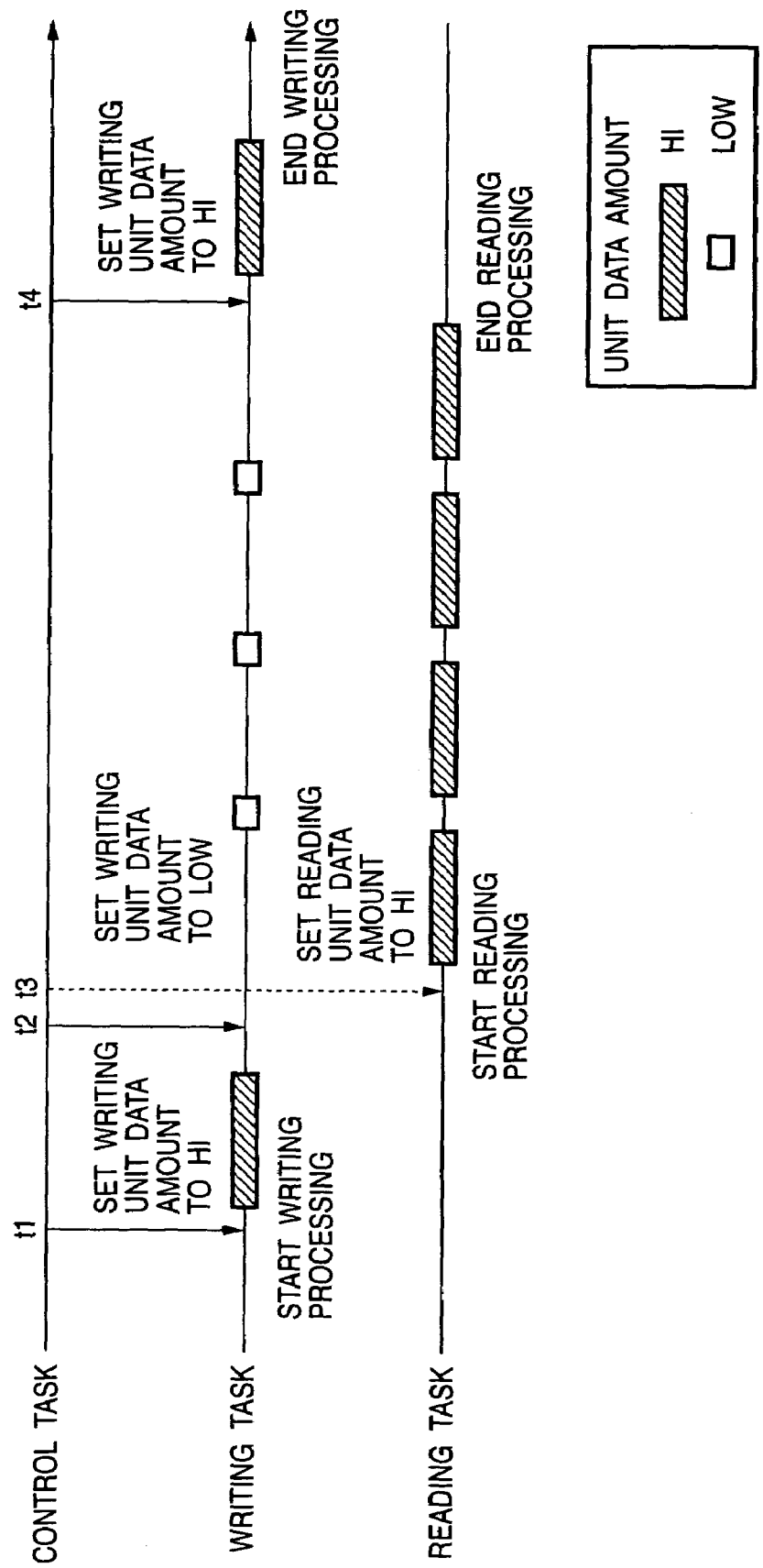
FIG. 8 is a timing chart for explaining task transition according to the first embodiment of the present invention.

As an example of the above-described control, FIG. 8 shows the sequence of a case wherein image data is read from the recording medium 200 to display it on the image display unit 28 while a sequence from image sensing to image data recording on the same recording medium 200 is performed.

First, at time t1, the control task instructs the writing task to perform writing on the recording medium 200. At this time, the writing unit data amount is set to HI in step S707. When an instruction is given to set the mode to the playback mode by the mode dial 60, the control task instructs the reading task to perform reading at time t3 (YES in step S709). To let the reading task exclusively use the recording medium 200 with priority, the writing unit data amount of the writing task is changed to LOW at time t2 prior to the reading instruction (step S712). The reading unit data amount of the reading task is set to HI in step S711. The writing unit data amount and reading unit data amount are separately controlled in this manner. Since the size by which the reading task reads at a time is as large as HI, the reading task exclusively uses the recording medium 200 for a long period to perform reading. On the contrary, since the size by which the writing task writes at a time is as small as LOW, the writing task exclusively uses the recording medium 200 only for a short period to perform writing.

According to FIG. 8, the reading task needs a preparation operation for a predetermined period after processing of each unit data amount of HI (YES in step S713), and the writing task is performed once to process a unit data amount of LOW during this period (the flow passes through step S718 once). Note that if the reading task is repeated in succession to process a unit data amount of HI at a time, the interval between processing of a unit data amount and that of the next unit data amount, i.e., the duration of each preparation operation may be extremely short (or no preparation operation is needed), and no unit data amount of LOW of the writing task may be processed. Alternatively, the duration of the preparation operation may be long, and a unit data amount of LOW of the writing task may be processed a plurality of times.

When reading is completed for all (YES in step S719), the control task sets the writing unit data amount of the writing task to HI at time t4 (step S720), thereby allowing the writing task to exclusively use the recording medium 200 for a long period, which makes it possible to finish writing earlier.

Note that in the first embodiment, if the mode is changed from the playback mode to an image sensing mode by an operation of the mode dial switch 60, the reading task is completed before the writing task which records image data obtained by actual image sensing on the recording medium 200 starts (NO in step S704 and YES in step S705). Accordingly, no multi-task situation occurs.

As has been explained above, according to the first embodiment, when performing the writing task and reading task in parallel the control task sets the unit data amount of the writing task with a lower priority to LOW. This allows the writing task to exclusively use the recording medium to shorten the duration of one writing operation and allows the reading task to be performed with priority to exclusively use the recording medium for a longer period to perform reading. When the reading task with a high priority is not working, the task efficiency can be increased by switching the writing unit data amount to HI.

By setting a unit data amount of LOW to correspond to a period when the task is not performed during the interval between processing of a unit data amount of a task and that of the next unit data amount when the task does not access a recording medium, even while the reading task with the higher priority is performed, writing processing can be performed during a period when the task does not access the recording medium this makes it possible to efficiently perform the reading task and writing task.

Note that although in the first embodiment, the priority of the reading task is set to be higher than that of the writing task, the priorities may be set vice versa. It is, of course, possible to change the priorities according to some conditions. More specifically, if the capacity of the memory 30 is small or the available capacity of the memory 30 becomes smaller than a predetermined capacity (e.g., a capacity required to store about one image), the writing task may be assigned a high priority.

Although in the first embodiment, each unit data amount is set to either HI or LOW, the present invention is not limited to this. For example, each unit data amount can be set according to the speed of access to a recording medium to be used. More specifically, the unit data amount can be increased when the speed of access to the recording medium is high while the unit data amount can be reduced when the access speed is low. At this time, a plurality of unit data amounts are held in advance, and an appropriate one of them may be selected. Unit data amounts denoted by HI and LOW are also not limited to 20 MB and 1 KB, respectively.

The first embodiment uses a recording medium as an input/output device. The present invention is also useful for a case wherein an input/output device is provided with a communication function to perform input/output from/to a remote large-capacity recording medium.

Second Embodiment

Next, the second embodiment of the present invention will be explained. Note that the second embodiment also uses the image processing apparatus explained with reference to FIG. 1 in the first embodiment, and an explanation thereof will be omitted.

Figure 9:
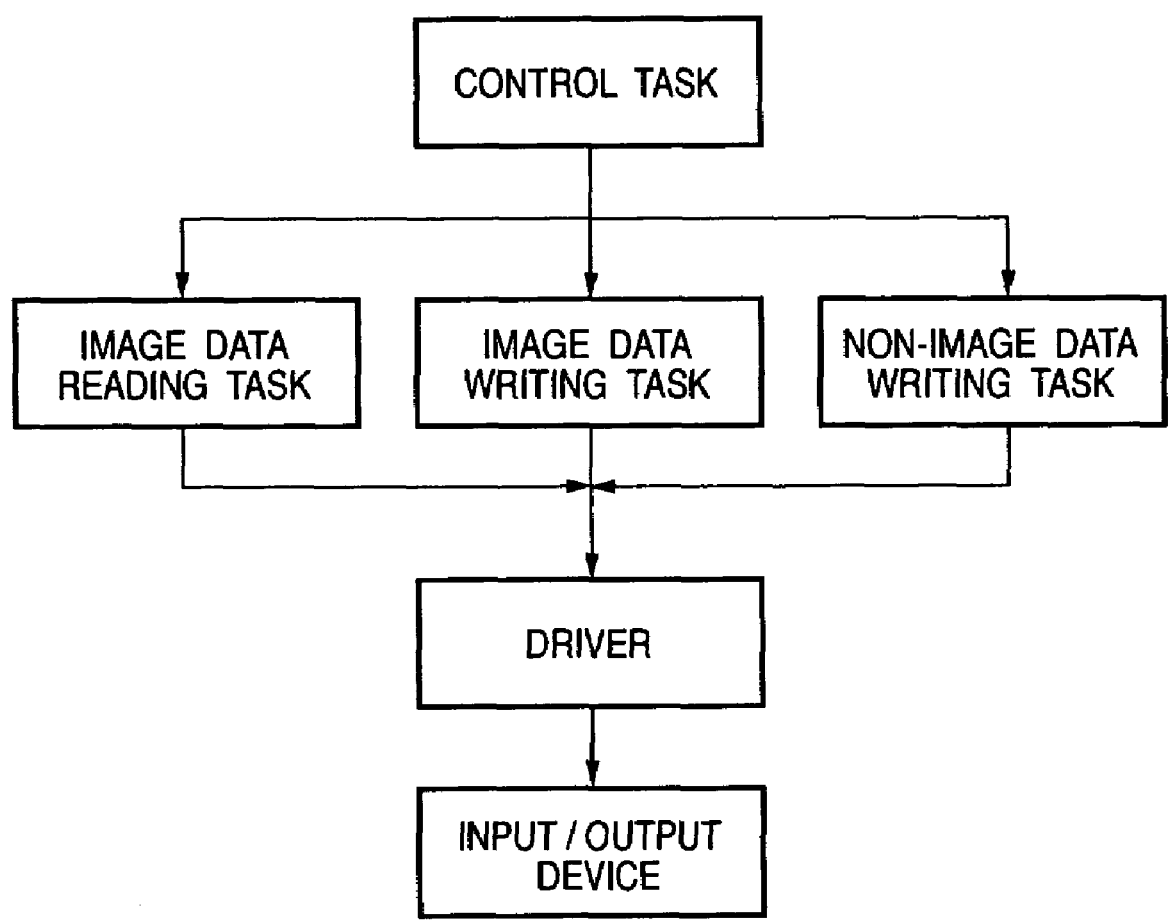
FIG. 9 is a diagram for explaining the relationship among tasks according to a second embodiment of the present invention.

First, various tasks will be explained. The second embodiment will focus attention on the relationship among four tasks of an image data writing task for recording, on a recording medium 200, image data in memory 30 created by image sensing processing, a non-image writing task for recording, on the recording medium 200, non-image data other than image data, an image data reading task for reading out, into the memory 30, image data recorded on the recording medium 200, and a control task for controlling these three tasks. FIG. 9 shows the relationship among the four tasks. In this embodiment, sensed image data and non-image data are temporarily stored in the memory 30 and then are written on the recording medium 200. Accordingly, in consideration of the usability for the user, the image data reading task is assigned a higher priority than the image data writing task and non-image data writing task. The priorities are set such that the priority ranking, from highest to lowest, is the image data reading task, image data writing task, and non-image data writing task.

The control task is a task which controls the image data writing task, non-image data writing task, and image data reading task. The control task sets a unit data amount which can be processed within an arbitrarily decided period (to be described later) for each of the tasks. In the second embodiment, the reading task has a higher priority than the writing tasks. For this reason, the control task switches the unit data amount of the image data writing task and that of the non-image data writing task, thereby performing control such that the image data reading task can exclusively use the recording medium with priority.

Of the four tasks, the image writing task and image reading task are the same as those explained with reference to FIGS. 3 and 4 in the first embodiment, and thus, an explanation thereof will be omitted. Note that since the operations of the image writing process (image data writing process) in step S302 of FIG. 3 and the image reading process (image data reading process) in step S402 of FIG. 4 are different from those explained with reference to FIGS. 5 and 6 in the first embodiment, the details of the operations will be described later with reference to FIGS. 11 and 12, respectively.

Figure 10:
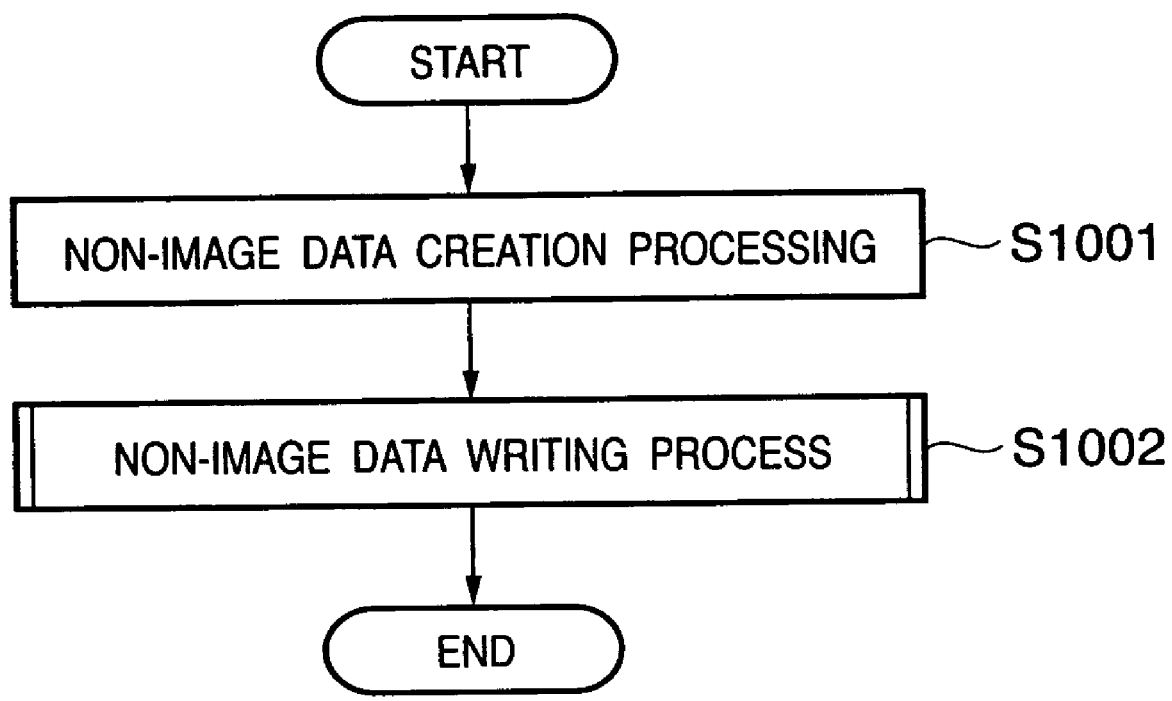
FIG. 10 is a flowchart for explaining a non-image data processing sequence according to the second embodiment of the present invention.

FIG. 10 is a flowchart for explaining a sequence to non-image data recording on the recording medium 200. In step S1001, non-image data desired to be recorded on the recording medium 200 is created in addition to image data obtained by image sensing, and the created non-image data is temporarily stored in the memory 30. Examples of non-image data can include DPOF file data, but the type of data is not specifically limited. The flow shifts to a non-image data writing process (step S1002). In the non-image data writing process, the non-image data stored in the memory 30 is written on the recording medium 200. The details of the non-image data writing process will be described later with reference to FIG. 13. The series of non-image writing operations are performed in this manner.

The image data writing process (task) for recording image data on the recording medium 200 according to the second embodiment to be performed in step S302 of FIG. 3 will be explained with reference to the flowchart of FIG. 11.

First, in step S1301, an image data writing unit data amount decided by the processing of the control task (to be described later with reference to FIGS. 15 to 21) is referred to. An image data writing unit data amount is the maximum amount of data which can be written on the recording medium 200 at a time while exclusively using the recording medium 200.

In step S1302, an image data writing unit data amount is set to the unit data amount referred to in step S1301. The flow shifts to step S1303 to perform writing on the recording medium 200 by the set unit data amount at a time. When writing of one unit data amount is completed, it is determined whether writing is completed for all image data. If writing is completed for all image data, the process ends; otherwise, the flow returns to step S1301 to repeat the same processing. This prevents the image data writing task from exclusively using the recording medium all the while the image data writing task writes image data on the recording medium in the image data writing processing.

The image data reading process (task) of reading image data from the recording medium 200 according to the second embodiment to be performed in step S402 of FIG. 4 will be explained with reference to the flowchart of FIG. 12.

First, in step S1401, an image data reading unit data amount decided by the processing of the control task (to be described later with reference to FIGS. 15 to 21) is referred to. An image data reading unit data amount is the maximum amount of data which can be read from the recording medium 200 at a time while exclusively using the recording medium 200.

In step S1402, an image data reading unit data amount is set to the unit data amount referred to in step S1401. The flow shifts to step S1403 to perform reading from the recording medium 200 by the set unit data amount at a time. When reading of one unit data amount is completed, it is determined whether reading is completed for all image data. If reading is completed for all image data, the process ends; otherwise, the flow returns to step S1401 to repeat the same processing. This prevents the image data reading task from exclusively using the recording medium all the while the image data reading task reads data from the recording medium in the image reading processing.

The non-image data writing process (task) for recording non-image data on the recording medium 200 to be performed in step S1002 of FIG. 10 will be explained with reference to the flowchart of FIG. 13.

First, in step S1501, a non-image data writing unit data amount decided by the processing of the control task (to be described later with reference to FIGS. 15 to 21) is referred to. A non-image data writing unit data amount is the maximum amount of data which can be written on the recording medium 200 at a time while exclusively using the recording medium 200, similarly to the image data writing unit data amount.

In step S1502, a non-image data writing unit data amount is set to the unit data amount referred to in step S1501. The flow shifts to step S1503 to perform writing on the recording medium 200 by the set unit data amount at a time. When writing of one unit data amount is completed, it is determined whether writing is completed for all non-image data. If writing is completed for all non-image data, the process ends; otherwise, the flow returns to step S1501 to repeat the same processing. This prevents the data writing task from exclusively using the recording medium while the data writing task writes data on the recording medium in the data writing processing.

Figure 11:
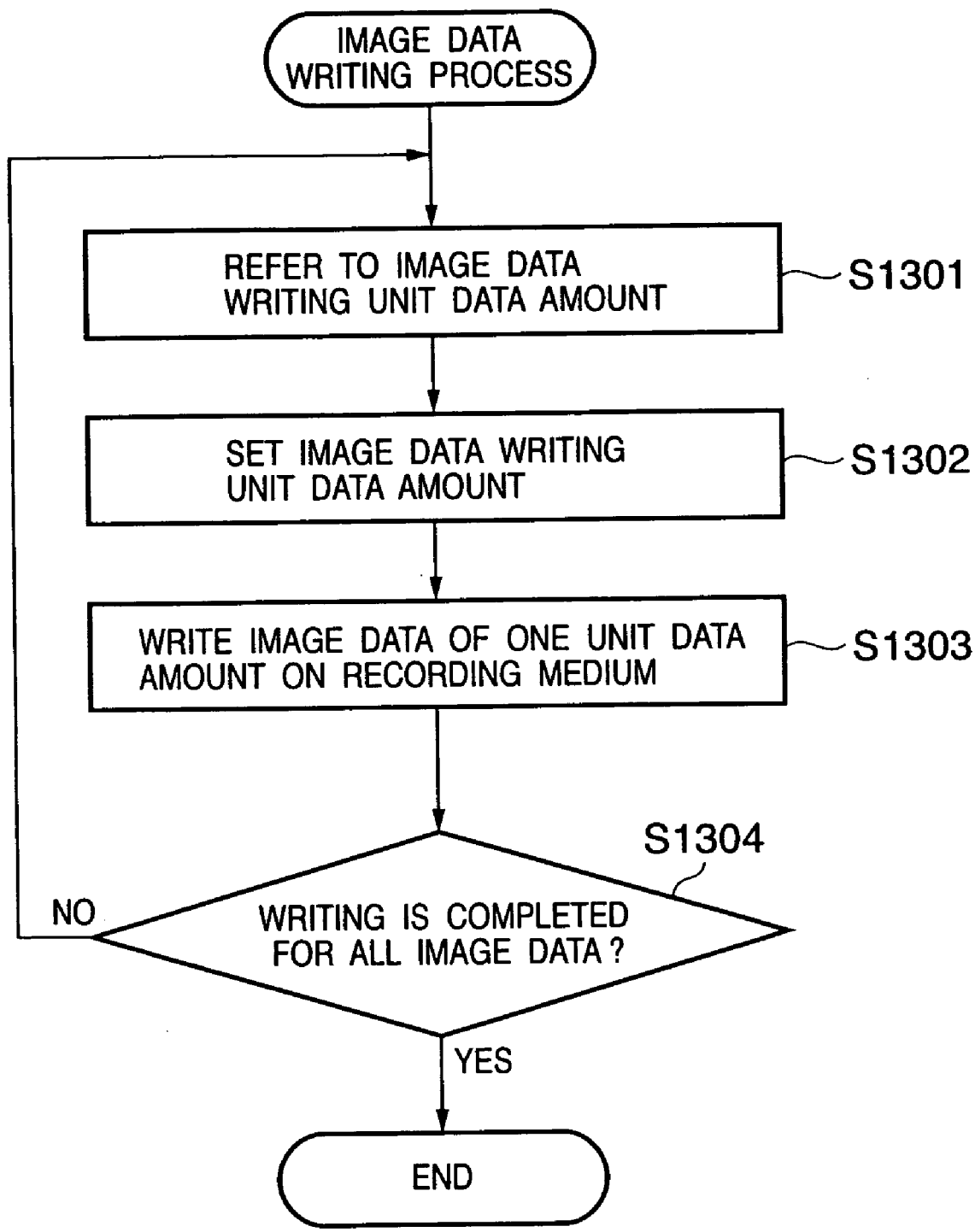
FIG. 11 is a flowchart for explaining a writing sequence in an image sensing sequence according to the second embodiment of the present invention.
Figure 12:
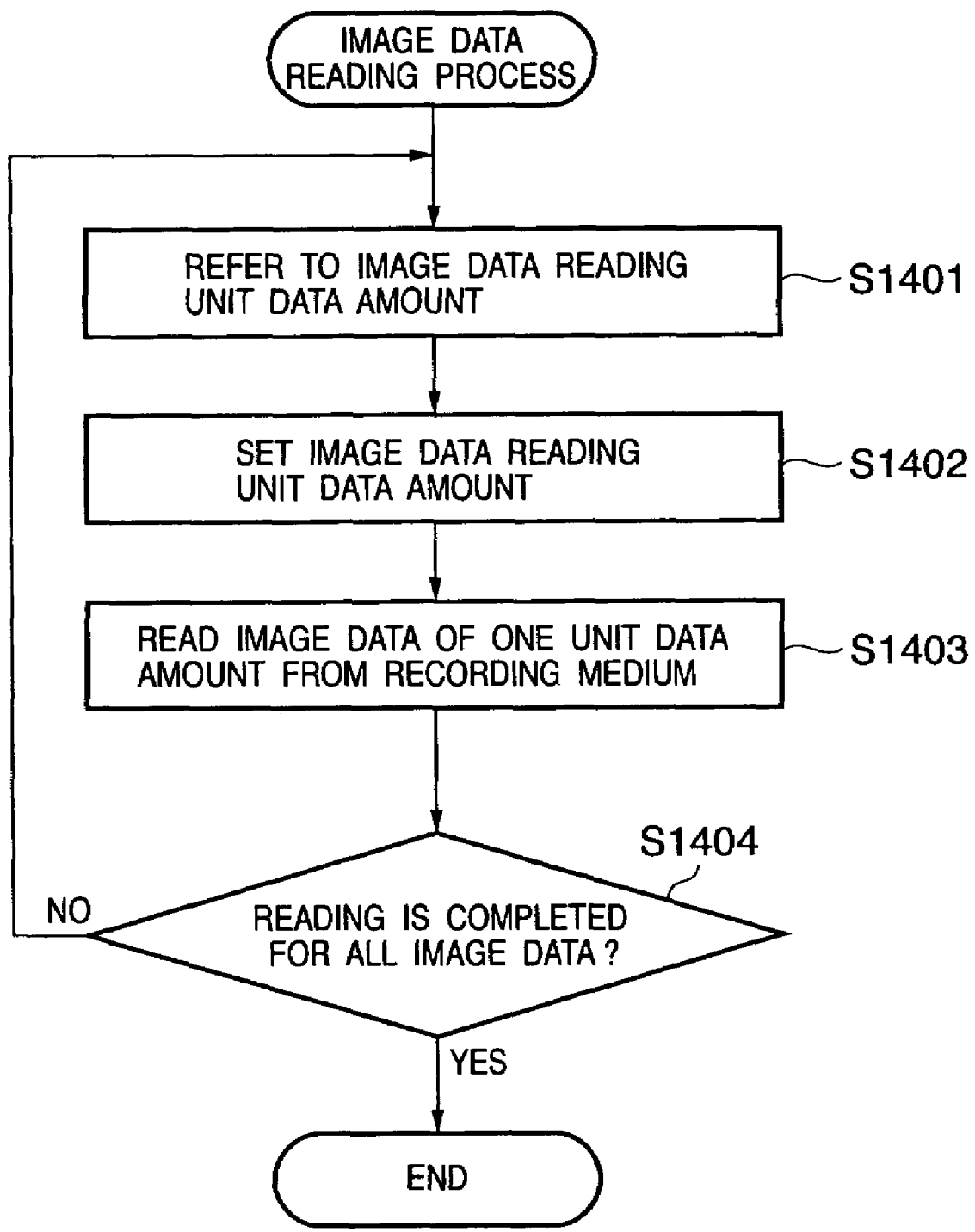
FIG. 12 is a flowchart for explaining a reading sequence in a playback sequence according to the second embodiment of the present invention.
Figure 13:
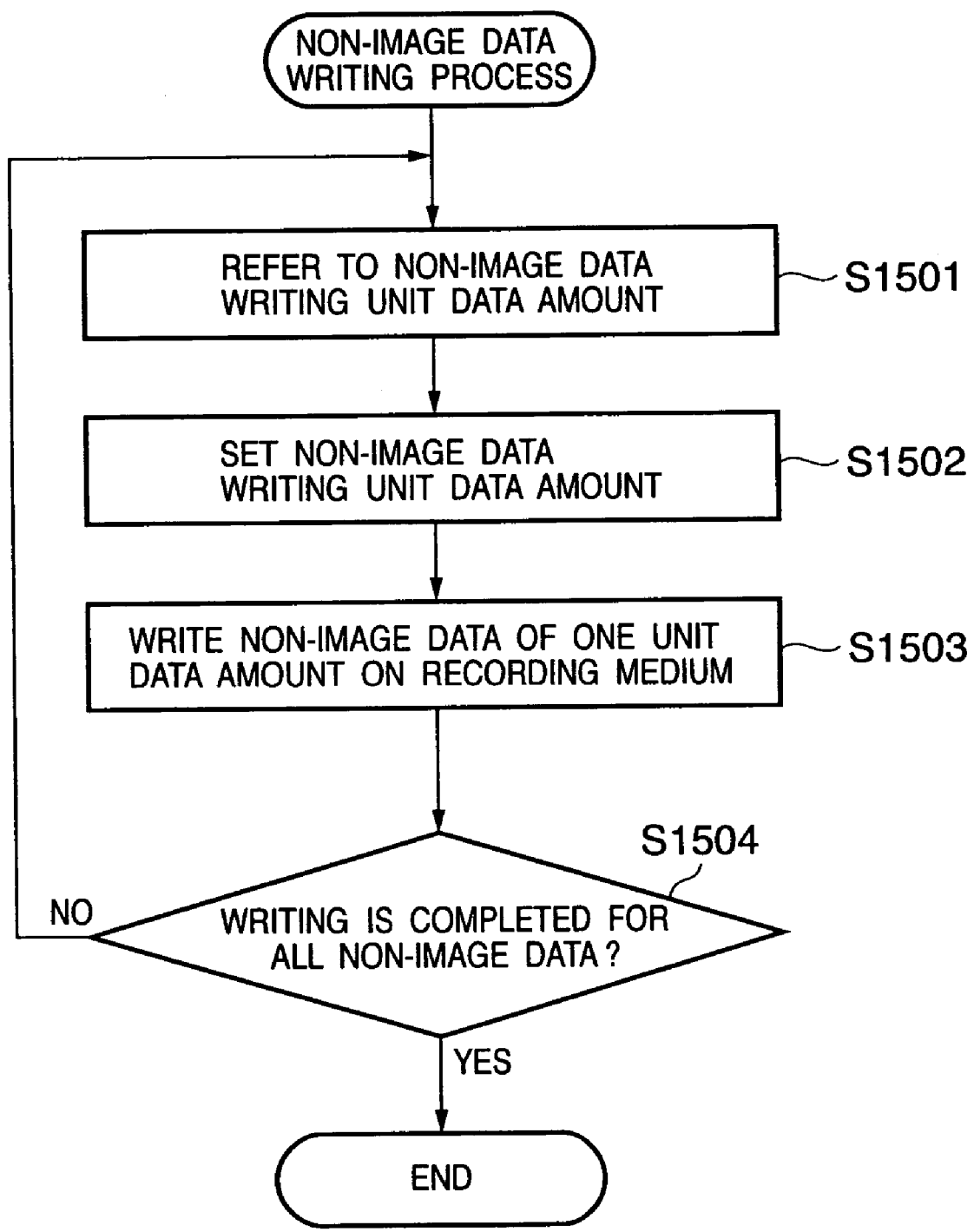
FIG. 13 is a flowchart for explaining a writing sequence in the non-image data processing sequence according to the second embodiment of the present invention.

In the second embodiment, if an instruction is given to perform a plurality of tasks in parallel, of the processes in steps S1301 to S1303 of FIG. 11, the processes in steps S1401 to S1403 of FIG. 12, and the processes in steps S1501 to S1503 of FIG. 13, processes corresponding to the instructed tasks are performed in turn.

Figure 14:
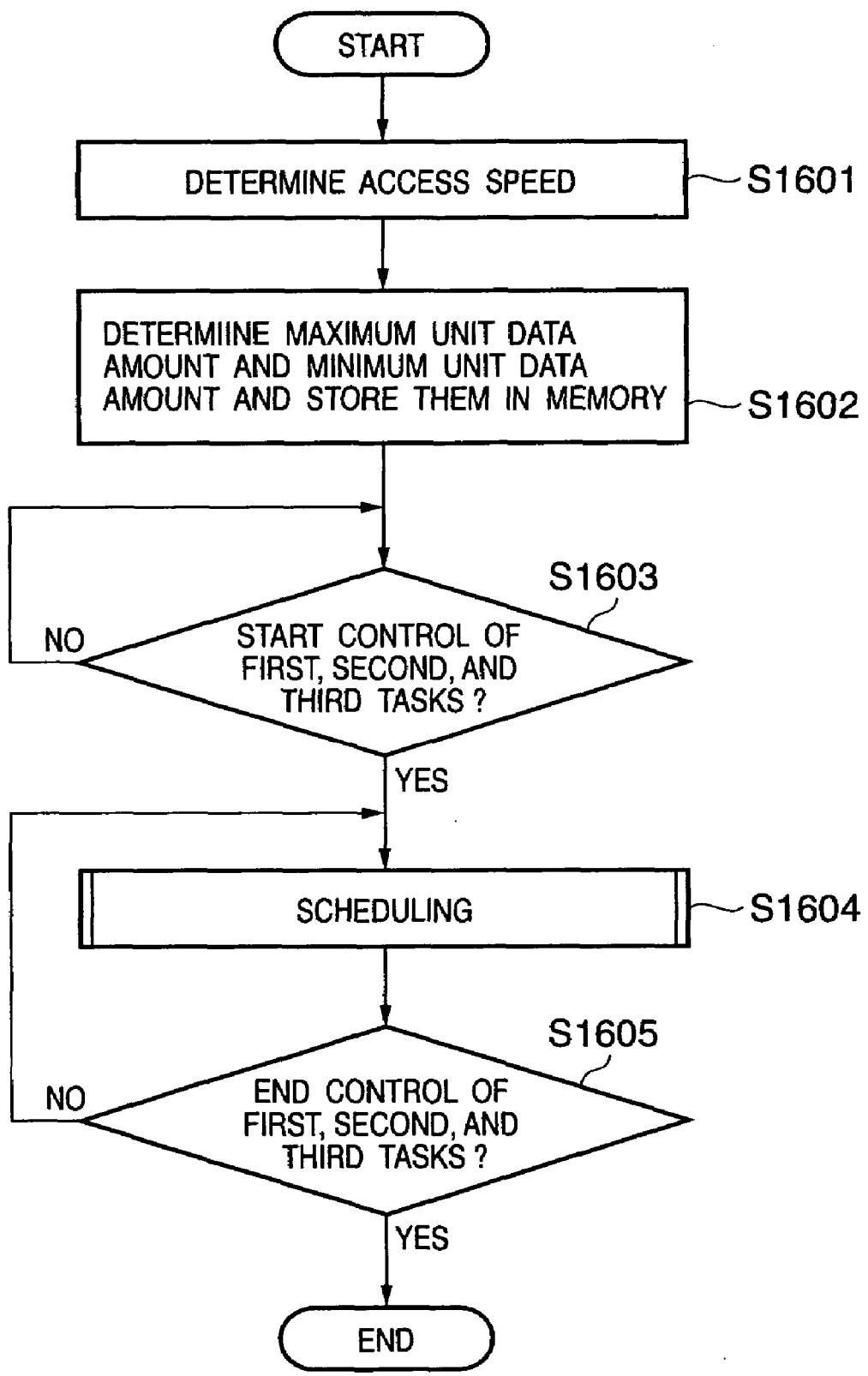
FIG. 14 is a flowchart for explaining a unit data amount setting sequence of a control task according to the second embodiment of the present invention.

Control of the unit data amounts of a plurality of tasks by the control task will be explained with reference to the flowchart of FIG. 14. In the explanation below, first to third tasks (in descending order of priority) will be described. Accordingly, in the second embodiment, the first task is the image data reading task; the second task, the image data writing task; and the third task, the non-image data writing task.

First, in step S1601, the speed of access to the recording medium 200 is determined through an input/output interface 90. In step S1602, a unit data amount which can be processed within an arbitrary period is decided from the access speed. In the second embodiment, the longest period is set to 200 msec, and a unit data amount which is processed in 200 msec is assumed as the maximum unit data amount. Also, the shortest period is set to 10 msec in the second embodiment, and a unit data amount which is processed in 10 msec is assumed as the minimum unit data amount. In this manner, the maximum unit data amount and minimum unit data amount are decided from the access speed and are stored in the memory 30.

In step S1603, when control of at least one of the first task, second task, and third task starts, the flow advances to step S1604 to perform scheduling (to be described later). The scheduling continues in step S1604 until it is determined in step S1605 that control of all of the first task, second task, and third task is completed.

Figure 15:
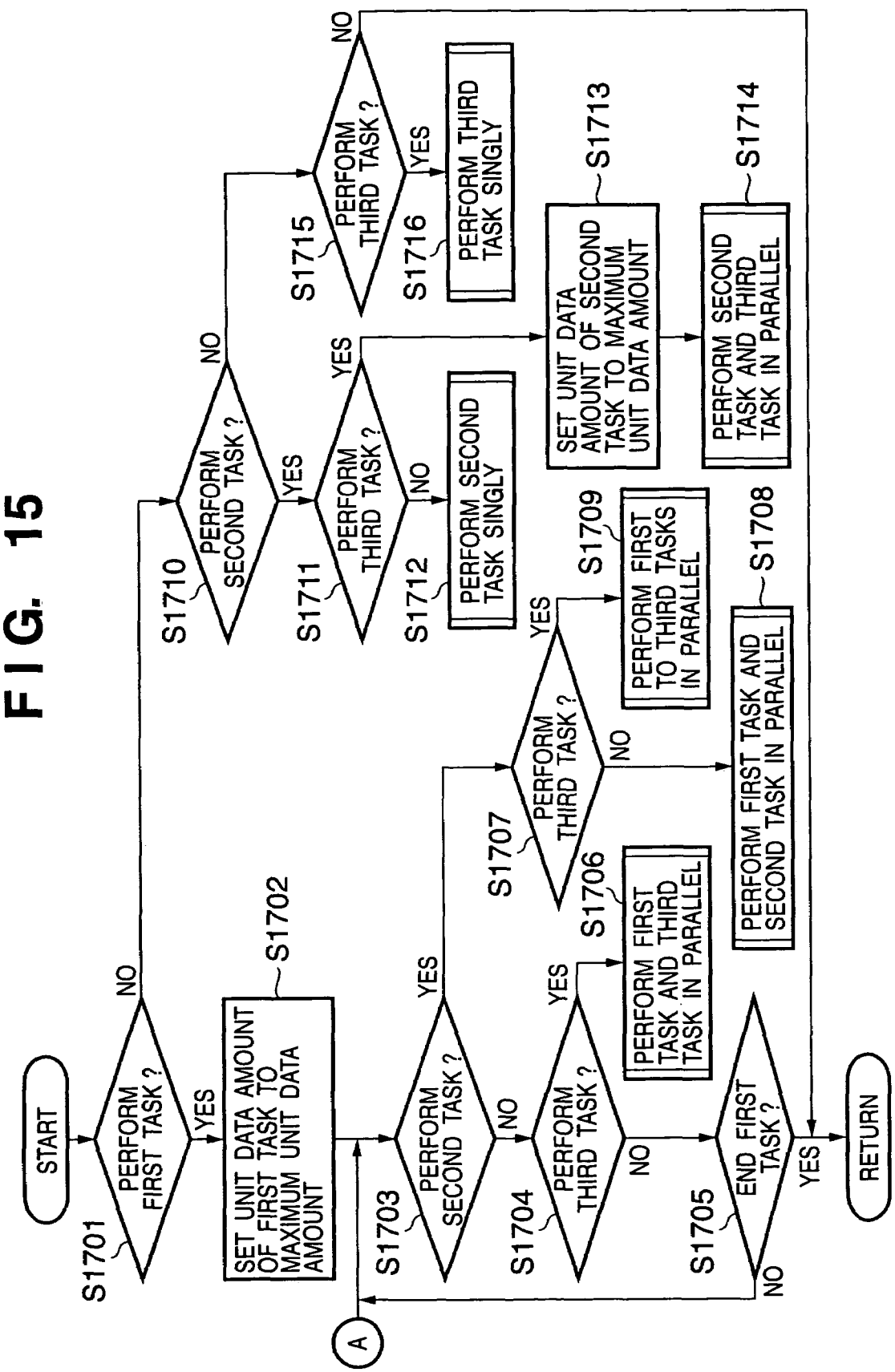
FIG. 15 is a flowchart for explaining a method by which a control task schedules a plurality of tasks according to the second embodiment of the present invention.

A scheduling method to be performed in step S1604 of FIG. 14 will be explained with reference to the flowchart of FIG. 15.

Figure 18:
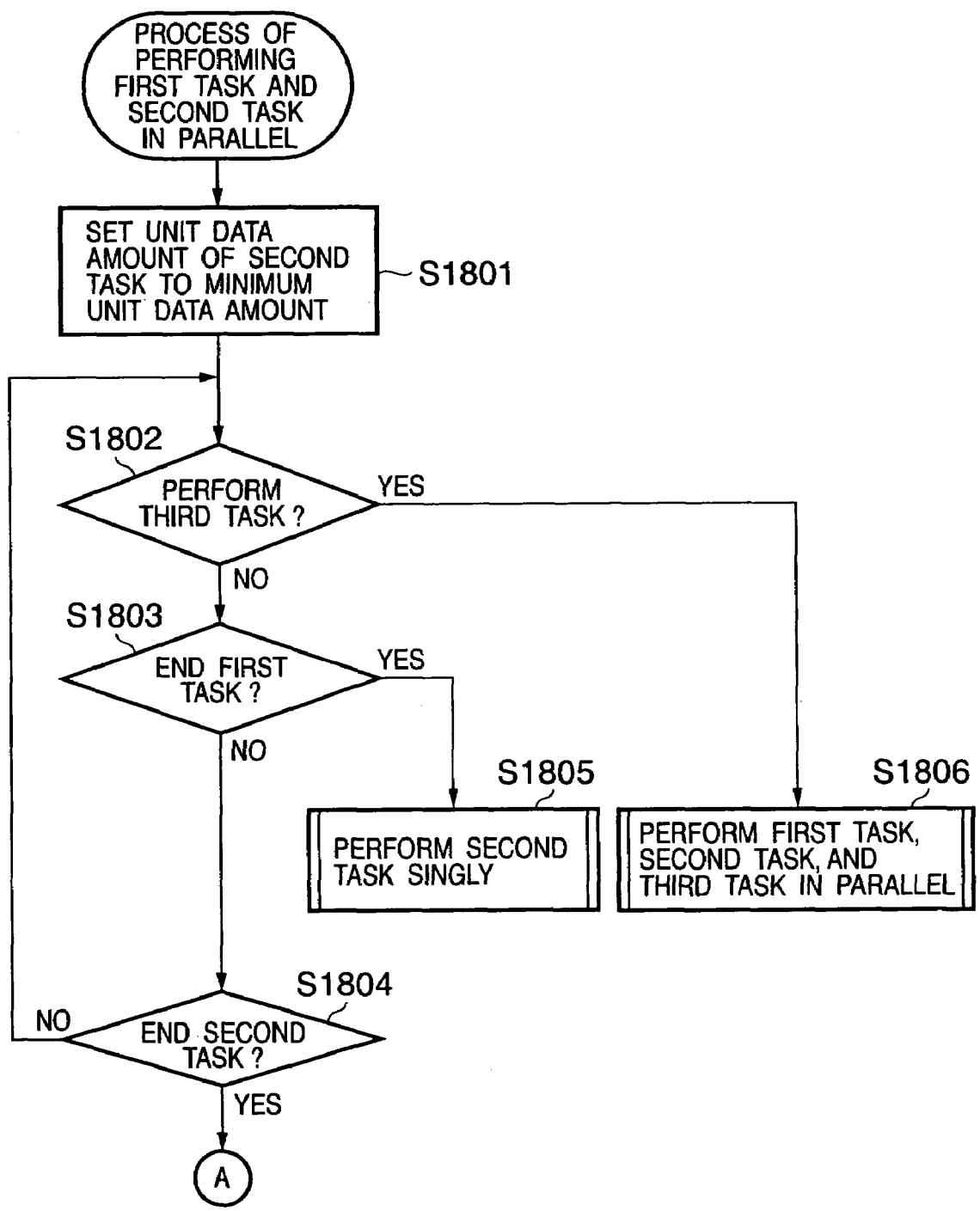
FIG. 18 is a flowchart for explaining the process of performing a first task and the second task in parallel according to the second embodiment of the present invention.
Figure 21:
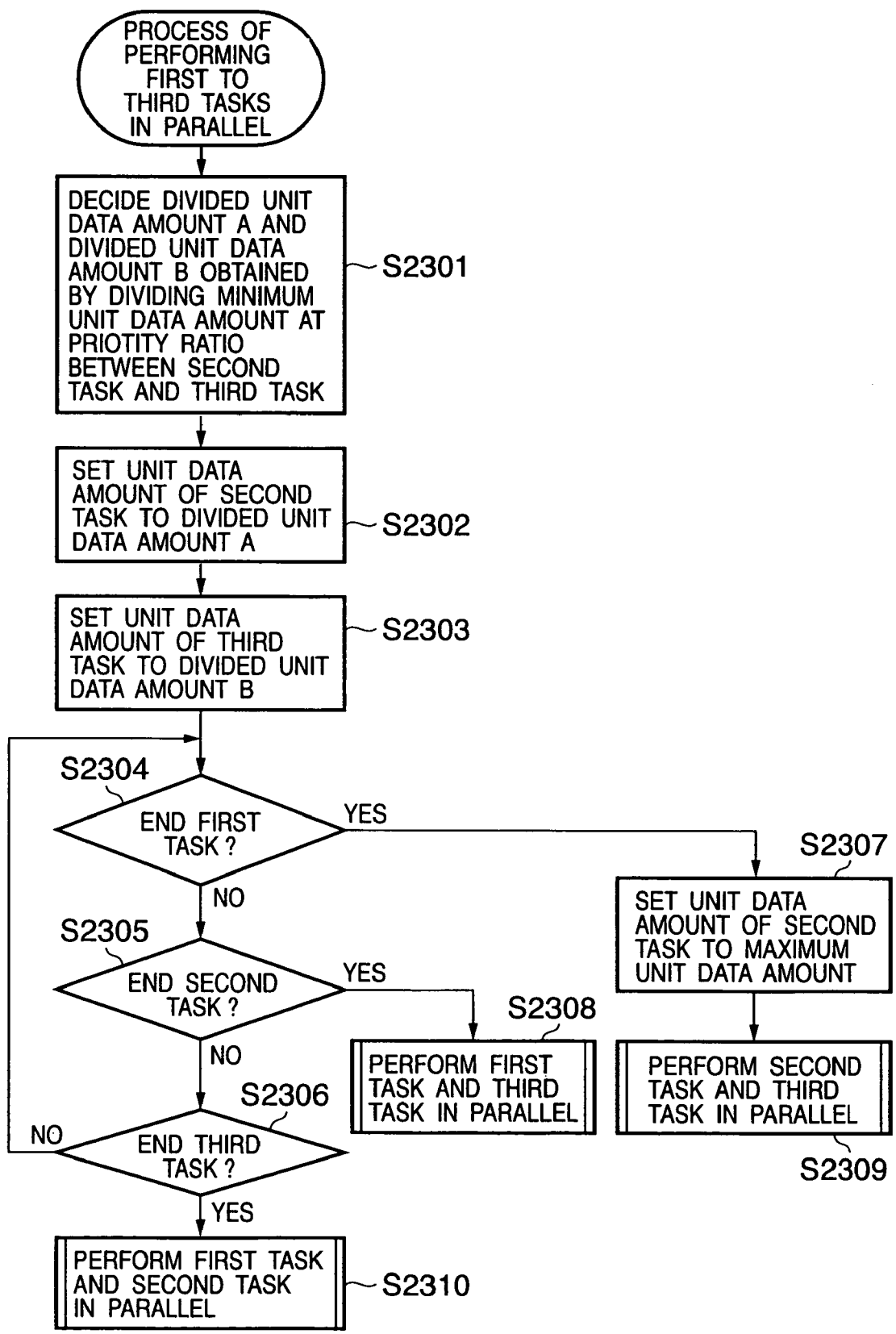
FIG. 21 is a flowchart for explaining the process of performing the first task to third task in parallel according to the second embodiment of the present invention.

First, in step S1701, it is determined whether to perform the first task. If the first task is to be performed, the unit data amount of the first task is set to the maximum unit data amount in step S1702. After that, it is determined in step S1703 whether to perform the second task. If the second task is to be performed, the flow advances to step S1707 to determine whether to perform the third task. If the third task is not to be performed, the first task and second task are performed in parallel in step S1708 (FIG. 18). If the third task is to be performed, the first to third tasks are performed in parallel in step S1709 (FIG. 21).

On the other hand, if it is determined in step S1703 that the second task is not to be performed, it is determined in step S1704 whether to perform the third task. If the third task is to be performed, the flow advances to step S1706 to perform the first task and third task in parallel (FIG. 19). If the third task is not to be performed, the first task is performed singly. Every time one unit data amount is processed, the flow advances to step S1705 to determine whether the first task is completed. If the first task is not completed, the flow returns to step S1703; otherwise, the flow returns to FIG. 14. In the latter case, since the result of determination in step S1605 is YES, the control process ends.

Figure 16:
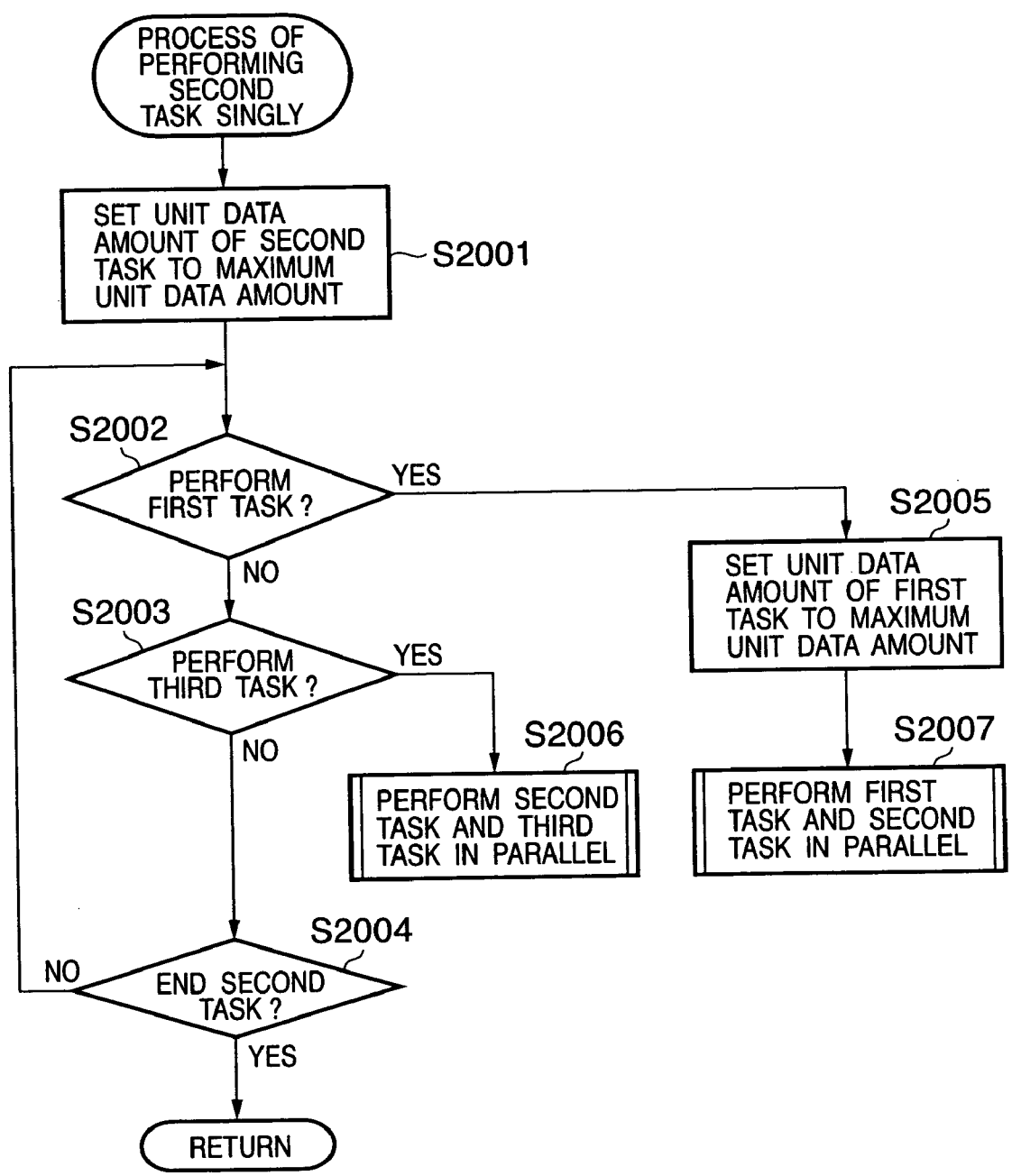
FIG. 16 is a flowchart for explaining the process of performing a second task singly according to the second embodiment of the present invention.
Figure 20:
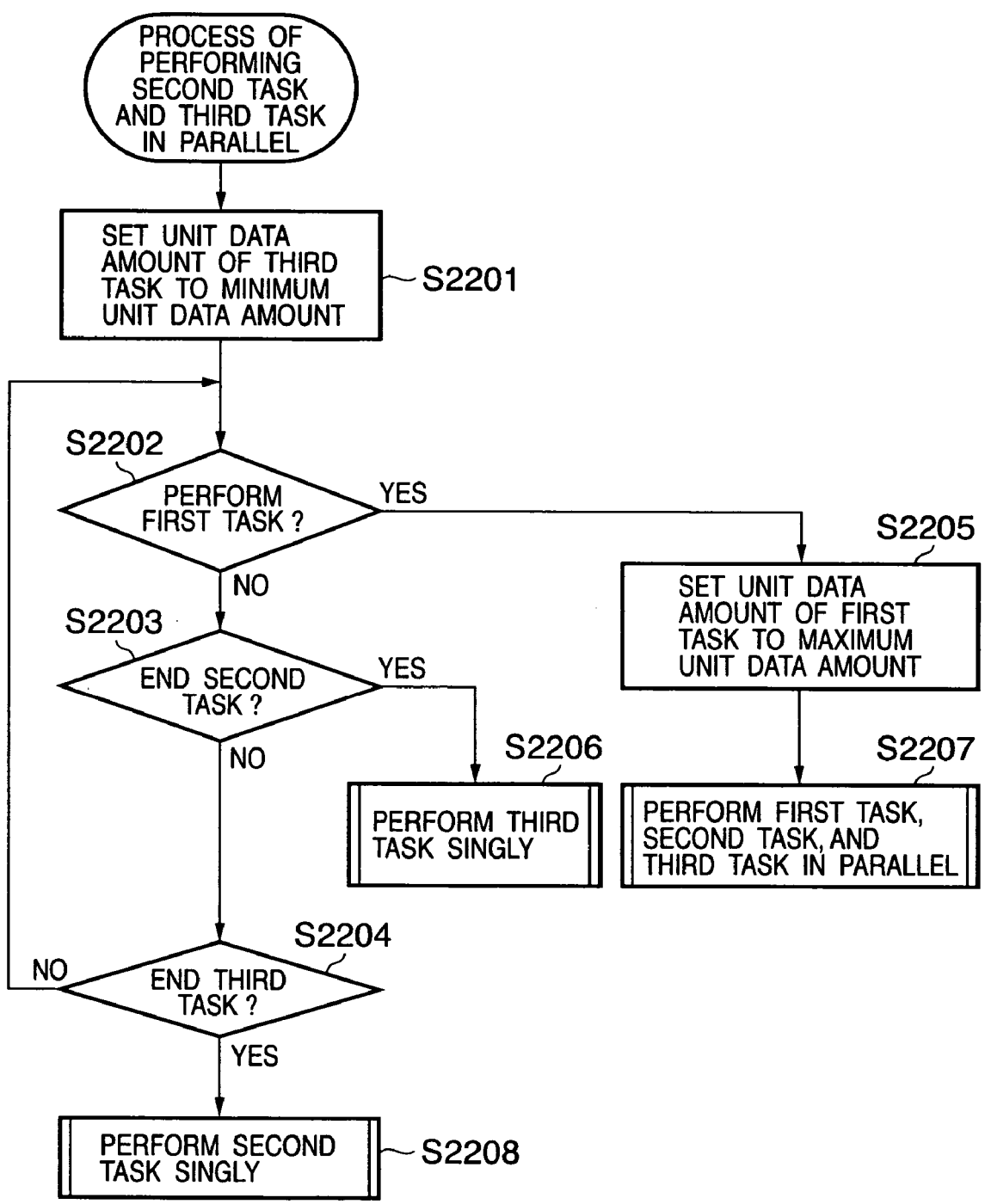
FIG. 20 is a flowchart for explaining the process of performing the second task and third task in parallel according to the second embodiment of the present invention.

On the other hand, if it is determined in step S1701 that the first task is not to be performed, the flow advances to step S1710 to determine whether to perform the second task. If the second task is to be performed, the flow advances to step S1711 to determine whether to perform the third task. If the third task is not to be performed, the flow advances to step S1712 to perform the second task singly (FIG. 16). If the third task is to be performed, the unit data amount of the second task is set to the maximum unit data amount in step S1713, and the flow advances to step S1714 to perform the second task and third task in parallel (FIG. 20).

Figure 17:
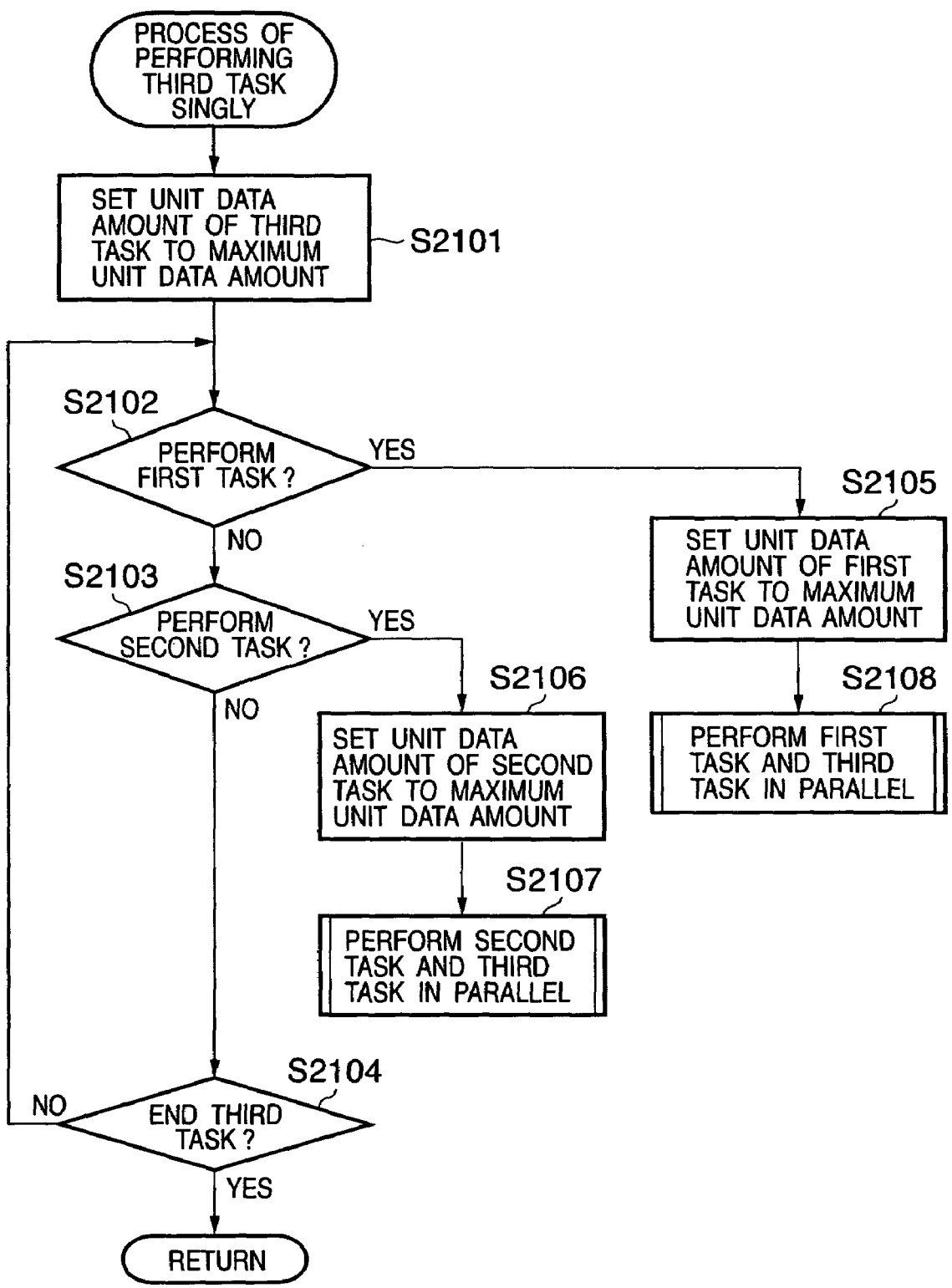
FIG. 17 is a flowchart for explaining the process of performing a third task singly according to the second embodiment of the present invention.

If it is determined in step S1710 that the second task is not to be performed, it is determined in step S1715 whether to perform the third task. If the third task is to be performed, the flow advances to step S1716 to perform the third task singly (FIG. 17). If the third task is not to be performed, none of the first to third tasks is performed, and the flow returns to FIG. 14. In this case, since the result of determination in step S1605 is YES, the control process ends.

The process of performing the second task singly to be performed in step S1712, the process of performing the third task singly to be performed in step S1716, the process of performing the first task and second task in parallel to be performed in step S1708, the process of performing the first task and third task in parallel to be performed in step S1706, the process of performing the second task and third task in parallel to be performed in step S1714, and the process of performing the first to third tasks in parallel to be performed in step S1709 will be explained in order.

FIG. 16 is a flowchart for explaining the process of performing the second task singly. First, in step S2001, the unit data amount of the second task is set to the maximum unit data amount. In step S2002, it is determined whether to perform the first task. If the first task is to be performed, the unit data amount of the first task is set to the maximum unit data amount in step S2005, and the flow advances to step S2007 to perform the first task and second task in parallel (FIG. 18). If the first task is not to be performed, it is determined in step S2003 whether to perform the third task. If the third task is to be performed, the flow advances to step S2006 to perform the second task and third task in parallel (to be described later) (FIG. 20). If the third task is not to be performed, it is determined in step S2004 whether the second task is completed. If the second task is not completed, the flow returns to step S2002 to repeat the above-described processing; otherwise, the flow returns to FIG. 14. In the latter case, since the result of determination in step S1605 is YES, the control process ends.

FIG. 17 is a flowchart for explaining the process of performing the third task singly. First, in step S2101, the unit data amount of the third task is set to the maximum unit data amount. In step S2102, it is determined whether to perform the first task. If the first task is to be performed, the unit data amount of the first task is set to the maximum unit data amount in step S2105. After that, the flow advances to step S2108 to perform the first task and third task in parallel (FIG. 19). If the first task is not to be performed, it is determined in step S2103 whether to perform the second task. If the second task is to be performed, the flow advances to step S2106. After the unit data amount of the second task is set to the maximum unit data amount in step S2106, the flow advances to step S2107 to perform the second task and third task in parallel (to be described later) (FIG. 20). If the second task is not to be performed, it is determined in step S2104 whether the third task is completed. If the third task is not completed, the flow returns to step S2102 to repeat the above-described processing; otherwise, the flow returns to FIG. 14. In the latter case, since the result of determination in step S1605 is YES, the control process ends.

FIG. 18 is a flowchart for explaining the process of performing the first task and second task in parallel. First, in step S1801, the unit data amount of the second task is set to the minimum unit data amount. In step S1802, it is determined whether to perform the third task. If the third task is to be performed, the flow advances to step S1806 to perform the first to third tasks in parallel (FIG. 21). If the third task is not to be performed, it is determined in step S1803 whether the first task is completed. If the first task is completed, the flow advances to step S1805 to perform the second task singly (FIG. 16). If the first task is not completed, it is determined in step S1804 whether the second task is completed. If the second task is not completed, the flow returns to step S1802 to repeat the above-described processing; otherwise, since the first task is to be performed singly, the flow returns to FIG. 15.

FIG. 19 is a flowchart for explaining the process of performing the first task and third task in parallel. First, in step S1901, the unit data amount of the third task is set to the minimum unit data amount. In step S1902, it is determined whether to perform the second task. If the second task is to be performed, the flow advances to step S1906 to perform the first to third tasks in parallel (FIG. 21). If the second task is not to be performed, it is determined in step S1903 whether the first task is completed. If the first task is completed, the flow advances to step S1905 to perform the third task singly (FIG. 17). If the first task is not completed, it is determined in step S1904 whether the third task is completed. If the third task is not completed, the flow returns to step S1902 to repeat the above-described processing; otherwise, since the first task is to be performed singly, the flow returns to FIG. 15.

FIG. 20 is a flowchart for explaining the process of performing the second task and third task in parallel. First, in step S2201, the unit data amount of the third task is set to the minimum unit data amount. In step S2202, it is determined whether to perform the first task. If the first task is to be performed, the flow advances to step S2205. After the unit data amount of the first task is set to the maximum unit data amount in step S2205, the first to third tasks are performed in parallel in step S2207 (FIG. 21). If the first task is not to be performed, it is determined in step S2203 whether the second task is completed. If the second task is completed, the flow advances to step S2206 to perform the third task singly (FIG. 17). If the second task is not completed, it is determined in step S2204 whether the third task is completed. If the third task is not completed, the flow returns to step S2202 to repeat the above-described processing; otherwise, since the second task is to be performed singly, the flow returns to FIG. 16 in step S2208.

FIG. 21 is a flowchart for explaining the process of performing the first to third tasks in parallel. First, in step S2301, a divided unit data amount A and divided unit data amount B obtained by dividing the minimum unit data amount at the priority ratio between the second task and the third task are calculated and decided.

Minimum Unit Data Amount=Divided Unit Data Amount A+Divided Unit Data Amount B

Divided Unit Data Amount A:Divided Unit Data Amount B=Priority of First Task:Priority of Second Task In step S2302, the unit data amount of the second task is set to the divided unit data amount A. Similarly, in step S2303, the unit data amount of the third task is set to the divided unit data amount B.

In step S2304, it is determined whether the first task is completed. If the first task is completed, the unit data amount of the second task is set to the maximum unit data amount in step S2307, and then the flow advances to step S2309 to perform the second task and third task in parallel (FIG. 20). If the first task is not completed, it is determined in step S2305 whether the second task is completed. If the second task is completed, the flow advances to step S2308 to perform the first task and third task in parallel (FIG. 19). If the second task is not completed, it is determined in step S2306 whether the third task is completed. If the third task is not completed, the flow returns to step S2304. If the third task is completed, the flow advances to step S2310 to perform the first task and second task in parallel (FIG. 18).

Such a change in unit data amount makes it possible to reduce the unit data amount of a task with a low priority and process a task with a high priority at higher speed when two or more tasks are performed. Also, when only one task is performed, the task being performed can be processed at high speed by increasing the unit data amount regardless of the priority of the task.

Figure 22:
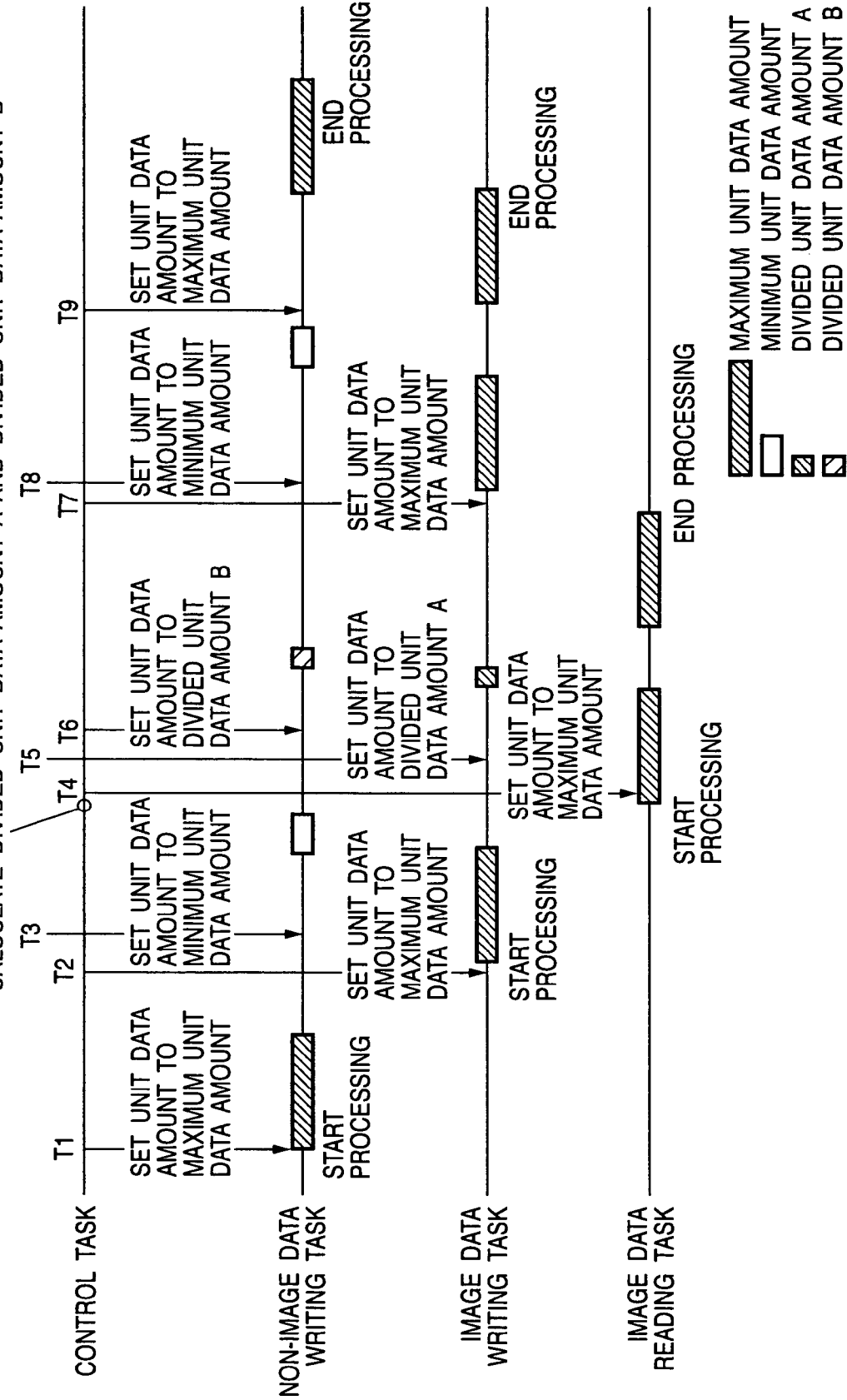
FIG. 22 is a timing chart for explaining task transition according to the second embodiment of the present invention.

FIG. 22 shows, as an example of the above-described control, the sequence of a case wherein when performing a sequence from image sensing to image data recording on the recording medium 200 while writing non-image data on the recording medium 200, image data is read from the same recording medium 200 and is displayed on an image display unit 28.

First, at time T1, the control task instructs the non-image data writing task to perform data writing on the recording medium 200. At this time, the non-image data writing unit data amount has been set to the maximum unit data amount in the process of performing the third task singly (step S2101 of FIG. 17). When image sensing is performed, the control task instructs the image data writing task to perform writing on the recording medium 200. At this time, the image data writing task is to be performed in parallel with the non-image data writing task (YES in step S2103 of FIG. 17). At time T2, the image data writing unit data amount is set to the maximum unit data amount to let the image data writing task exclusively use the recording medium 200 with priority (step S2106 of FIG. 17). The flow shifts to the process of performing the image data writing process and non-image data writing process in parallel (FIG. 20). At time T3, the non-image data writing unit data amount is changed to the minimum unit data amount (step S2201 of FIG. 20).

When an instruction is given to set the mode to a playback mode by a mode dial 60 (YES in step S2202 of FIG. 20), the control task instructs the image data reading task to perform reading at time T4. At this time, the image data writing task, non-image data writing task, and image data reading task are to be performed in parallel. The image data reading unit data amount is set to the maximum unit data amount to let the reading task exclusively use the recording medium 200 with priority (step S2205 of FIG. 20). After that, the flow shifts to FIG. 21. In step S2301, values obtained by dividing the minimum unit data amount at the priority ratio between the image data writing task and the non-image data wiring task are calculated. The unit data amount of the image data writing task and that of the non-image data writing task are set to the divided unit data amount A and divided unit data amount B at times T5 and T6, respectively (steps S2302 and S2303 of FIG. 21). Separate control of the non-image data writing unit data amount, image data writing unit data amount, and image data reading unit data amount in this manner produces the following effect. More specifically, the size of data which the image data reading task with the highest priority reads at a time is the maximum unit data amount, and thus the image data reading task exclusively uses the recording medium 200 for a long period to perform reading. On the contrary, the sizes of data which the image data writing task and non-image data writing task write at a time are smaller than the minimum unit data amount, and thus each of the image data writing task and non-image data writing task exclusively uses the recording medium 200 for a short period to perform writing.

When reading processing is completed for all image data (YES in step S2304 of FIG. 21), the control task sets the unit data amount of the image data writing task to the maximum unit data amount at time T7 (step S2307 of FIG. 21), and then the flow shifts to the process of performing the image data writing task and non-image data writing task in parallel (FIG. 20). The control task sets the non-image data writing unit data amount to the minimum unit data amount at time T8 (step S2201 of FIG. 20). Since the size of data which the image data writing task writes at a time is the maximum unit data amount, the image data writing task exclusively uses the recording medium 200 for a long period. On the contrary, since the size of data which the non-image data writing task writes at a time is the minimum unit data amount, the non-image data writing task exclusively uses the recording medium 200 for a short period to perform writing.

When writing processing is completed for all image data (YES in step S2203 of FIG. 20), the flow shifts to the process of performing the non-image data writing task singly (FIG. 17). The control task sets the unit data amount of the non-image data writing task to the maximum unit data amount at time T9 (step S2101 of FIG. 17) to allow the data writing task to exclusively use the recording medium 200 for a long period and perform writing at higher speed.

As has been described above, according to the second embodiment, when the image data writing task, non-image data writing task, and image data reading task are to be performed in parallel, the control task sets the unit data amounts of the non-image data writing task and image data writing task with a lower priority to be small. This makes it possible to shorten one period when each writing task exclusively uses the recording medium to perform writing and let the image data reading task desired to be performed with priority exclusively use the recording medium for a longer period to perform reading. When the image data reading task with a high priority is not working, the task efficiency can be increased by switching the unit data amount of the image data writing task to the maximum and switching that of the non-image data writing task to the minimum. Also, when the image data reading task and image data writing task with higher priorities are not working, the task efficiency can be increased by switching the unit data amount of the non-image data writing task to the maximum.

A case has been explained wherein up to three tasks are performed in parallel. Even when there are more than three tasks, the tasks can be performed efficiently on the basis of their priorities through the same processing.

The priorities of the image data writing task, non-image data writing task, and image data reading task are not limited to those explained in the above-described example. The priorities may be appropriately changed so as to improve the usability.

Other Embodiments

The invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application Nos. 2004-238628 filed on Aug. 18, 2004 and 2005-141831 filed on May 13, 2005 which are hereby incorporated herein by reference herein.

What is claimed is:

1. An image sensing/playback apparatus comprising:
an image sensing device that senses an image of an object and obtains electrical image data;
an input/output unit that inputs/outputs data including image data from/to an external storage medium;
a controller that sequentially performs a plurality of tasks, having respective priorities decided in advance, while giving an opportunity to switch between the plurality of tasks after processing of one unit data amount of data, the plurality of tasks exclusively controlling said input/output unit when being executed, wherein the one unit data amount is one of a plurality of different data amounts to be processed in one operation, and if an instruction is given to perform one of the plurality of tasks while at least another task is performed, said controller sets one unit data amount of a task with a higher priority of the tasks to be performed to a larger data amount and one unit data amount of a task with a lower priority to a data amount smaller than the data amount of the task with the higher priority to perform the tasks, and
further wherein said controller sequentially performs as the plurality of tasks an input task of inputting one frame image data and an output task of outputting one frame image data, and divides the one frame image data of each of the input task and the output task so that a divided data amount of the one frame image data of one of the input task and the output task with the higher priority is larger than a divided data amount of the one frame image data of the other of the input task and the output task with the lower priority.

2. The image sensing/playback apparatus according to claim 1, wherein the one unit data amount is one of a first unit data amount that is large and a second unit data amount that is smaller than the first unit data amount, and if an instruction is given to perform a second task of the plurality of tasks while a first task, different from the second task, is performed to process the first unit data amount at a time, said controller sets a unit data amount of one with a higher priority of the first and second tasks to the first unit data amount and a unit data amount of the other with a lower priority to the second unit data amount to perform the tasks.

3. The image sensing/playback apparatus according to claim 2, wherein when the task with the higher priority does not exclusively use said input/output unit during an interval between consecutive processing of data of the first unit data amount while the task with the higher priority is performed to process the first unit data amount at a time, the task with the lower priority is performed to process the second unit data amount at a time during the interval.

4. The image sensing/playback apparatus according to claim 2, wherein when the task with the higher priority is completed and the task with the lower priority is not completed while the first task and second task are performed, said controller changes the unit data amount of the task with the lower priority to the first unit data amount.

5. The image sensing/playback apparatus according to claim 2, wherein when any one of the plurality of tasks is performed singly, said controller controls the task to process the first unit data amount at a time.

6. The image sensing/playback apparatus according to claim 1, wherein the task with the higher priority is the input task, and the task with the lower priority is the output task.

7. The image sensing/playback apparatus according to claim 1, further comprising an internal storage medium that temporarily stores image data obtained by said image sensing device and temporarily stores image data read from the external storage medium, wherein said controller sets a priority of the input task to be higher than a priority of the output task if an available capacity of said internal storage medium is larger than a predetermined capacity and sets the priority of the output task to be higher than the priority of the input task if the available capacity is not more than the predetermined capacity.

8. The image sensing/playback apparatus according to claim 2, further comprising a determination unit that determines a speed of access to the external storage medium, wherein said controller sets the first unit data amount such that the first unit data amount becomes larger if the speed of access is high than if the speed of access is low.

9. The image sensing/playback apparatus according to claim 1, further comprising a unit data amount obtainment unit that obtains a speed of access to the external storage medium and obtains, as a plurality of unit data amounts, a plurality of data amounts that can be processed within a predetermined period on the basis of the obtained speed of access.

10. The image sensing/playback apparatus according to claim 1, wherein when at least one of a plurality of tasks is completed while the plurality of tasks are performed, said controller sets one unit data amount of a task with the highest priority of uncompleted tasks to the largest data amount and sets one unit data amount of a task with a lower priority to a data amount smaller than the data amount of the task with the highest priority.

11. A data processing method in an image sensing/playback apparatus having an image sensing device that senses an image of an object and obtains electrical image data, an input/output unit that inputs/outputs data including image data from/to an external storage medium, and a controller that sequentially performs a plurality of tasks, having respective priorities decided in advance, while giving an opportunity to switch between the plurality of tasks after processing of one unit data amount of data, the plurality of tasks exclusively controlling the input/output unit when being executed, the method comprising:
if an instruction is given to perform one of the plurality of tasks while at least another task is performed, setting by the controller one unit data amount of a task with a higher priority of the tasks to be performed to a larger data amount and one unit data amount of a task with a lower priority to a data amount smaller than the data amount of the task with the higher priority, and wherein said controller sequentially performs as the plurality of tasks an input task of inputting one frame image data and an output task of outputting one frame image data, and divides the one frame image data of each of the input task and the output task so that a divided data amount of the one frame image data of one of the input task and the output task with the higher priority is larger than a divided data amount of the one frame image data of the other of the input task and the output task with the lower priority.

12. The data processing method according to claim 11, wherein the one unit data amount is one of a first unit data amount that is large and a second unit data amount that is smaller than the first unit data amount, and if an instruction is given to perform a second task of the plurality of tasks while a first task, different from the second task, is performed to process the first unit data amount at a time, a unit data amount of one with a higher priority of the first and second tasks is set to the first unit data amount, and a unit data amount of the other with a lower priority is set to the second unit data amount.

13. The data processing method according to claim 12, further comprising, when the task with the higher priority does not exclusively use the input/output unit during an interval between consecutive processing of data of the first unit data amount while the task with the higher priority is performed to process the first unit data amount at a time, performing the task with the lower priority to process the second unit data amount at a time.

14. The data processing method according to claim 12, further comprising, when the task with the higher priority is completed and the task with the lower priority is not completed while the first task and second task are performed, changing the unit data amount of the task with the lower priority to the first unit data amount.

15. The data processing method according to claim 12, further comprising, when any one of the plurality of tasks is performed singly, performing the task to process the first unit data amount at a time.

16. The data processing method according to claim 11, wherein the task with the higher priority is the input task, and the task with the lower priority is the output task.

17. The data processing method according to claim 11, wherein the image sensing/playback apparatus further has an internal storage medium that temporarily stores image data obtained by the image sensing device and temporarily stores image data read from the external storage medium, and the method further comprises setting a priority of the input task to be higher than a priority of the output task if an available capacity of the internal storage medium is larger than a predetermined capacity and setting the priority of the output task to be higher than the priority of the input task if the available capacity is not more than the predetermined capacity.

18. The data processing method according to claim 12, further comprising:

determining a speed of access to the external storage medium; and setting the first unit data amount such that the first unit data amount becomes larger if the speed of access is high than if the speed of access is low.

19. The data processing method according to claim 11, further comprising obtaining a speed of access to the external storage medium and obtaining, as a plurality of unit data amounts, a plurality of data amounts that can be processed within a predetermined period on the basis of the obtained speed of access.

20. The data processing method according to claim 11, further comprising, when at least one of a plurality of tasks is completed while the plurality of tasks are performed, setting by the controller one unit data amount of a task with the highest priority of uncompleted tasks to the largest data amount and setting one unit data amount of a task with a lower priority to a data amount smaller than the data amount of the task with the highest priority.

21. An information processor readable storage medium having an information processor executable program stored therein, the program having a program code for implementing a data processing method according to claim 11.

* * * * *